US012610299B2

(12) United States Patent
Fujishiro

(10) Patent No.: US 12,610,299 B2
(45) Date of Patent: Apr. 21, 2026

(54) USER EQUIPMENT, NODE, AND COMMUNICATION METHOD

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 18/456,319

(22) Filed: Aug. 25, 2023

(65) Prior Publication Data

US 2024/0340745 A1      Oct. 10, 2024

Related U.S. Application Data

(63) Continuation of application No. PCT/JP2023/014117, filed on Apr. 5, 2023.

(51) Int. Cl.
*H04W 36/30* (2009.01)
*H04W 36/36* (2009.01)
*H04W 76/20* (2018.01)

(52) U.S. Cl.
CPC ....... *H04W 36/304* (2023.05); *H04W 36/362* (2023.05); *H04W 76/20* (2018.02)

(58) Field of Classification Search
CPC .. H04W 36/304; H04W 36/362; H04W 76/20
See application file for complete search history.

(56) References Cited

U.S. PATENT DOCUMENTS

| 10,880,054 B2 | 12/2020 | Uchino et al. | |
| 2015/0009898 A1* | 1/2015 | Rosa ..................... | H04L 5/0048 |
| | | | 370/328 |

| 2016/0080997 A1* | 3/2016 | Hu .................... | H04W 36/0069 |
| | | | 455/442 |
| 2016/0128003 A1* | 5/2016 | Callender ........... | H04W 52/365 |
| | | | 370/311 |
| 2016/0262118 A1* | 9/2016 | Kim ........................ | H04L 5/001 |

(Continued)

FOREIGN PATENT DOCUMENTS

| CN | 103200610 A | 7/2013 |
| CN | 111436074 A | 7/2020 |
| WO | 2015/064516 A1 | 5/2015 |

OTHER PUBLICATIONS

3rd Generation Partnership Project; Technical Specification Group Radio Access Network; NR; NR and NG-RAN Overall Description; Stage 2 (Release 17); 3GPP TS 38.300 V17.3.0; Dec. 2022; pp. 1-210.

(Continued)

*Primary Examiner* — Charles N Appiah
*Assistant Examiner* — Frank E Donado
(74) *Attorney, Agent, or Firm* — Studebaker Brackett PLLC

(57) ABSTRACT

A user equipment for performing wireless communication with a node using carrier aggregation in a mobile communication system includes a receiver that receives, from the node, information indicating a radio quality condition that is to be met for the user equipment to perform an activation process for a secondary cell configured for the user equipment, and a controller that measures radio quality and evaluates whether the radio quality condition is met. The controller performs the activation process for the secondary cell in response to the radio quality condition being met.

18 Claims, 14 Drawing Sheets

(56)　　　　　　References Cited

U.S. PATENT DOCUMENTS

| | | | | |
|---|---|---|---|---|
| 2016/0277172 | A1* | 9/2016 | Yu | H04L 5/0055 |
| 2016/0330697 | A1* | 11/2016 | Chen | H04W 76/15 |
| 2018/0007731 | A1* | 1/2018 | Park | H04L 5/001 |
| 2019/0037458 | A1* | 1/2019 | Kadiri | H04W 76/20 |
| 2019/0182694 | A1* | 6/2019 | Martin | H04W 24/10 |
| 2021/0136802 | A1 | 5/2021 | Cirik et al. | |
| 2021/0235538 | A1* | 7/2021 | Hong | H04W 76/27 |
| 2021/0337560 | A1* | 10/2021 | Xiao | H04L 27/26025 |
| 2021/0392651 | A1* | 12/2021 | Futaki | H04W 72/23 |
| 2021/0409170 | A1* | 12/2021 | Cirik | H04W 74/0808 |
| 2022/0046522 | A1* | 2/2022 | Kim | H04W 52/365 |
| 2022/0085948 | A1* | 3/2022 | Li | H04L 5/0051 |
| 2022/0124853 | A1 | 4/2022 | Virtej et al. | |
| 2022/0183094 | A1* | 6/2022 | Yilmaz | H04W 76/15 |
| 2022/0394583 | A1* | 12/2022 | Deenoo | H04W 24/08 |
| 2024/0073813 | A1* | 2/2024 | Sun | H04L 5/0048 |
| 2024/0276318 | A1* | 8/2024 | Zheng | H04W 36/362 |

OTHER PUBLICATIONS

Huawei, HiSilicon; "CR on SCell activiation requirements of FR2-2"; 3GPP TSG-RAN WG4 Meeting #104-bis-e; R4-2216263; Electronic Meeting; Oct. 10-Oct. 19, 2022; pp. 1-10.

Huawei, HiSilicon; "Big CR: RRM requirements for Rel-17 Further Multi-RAT Dual-Connectivity enhancements (TS 38.133)"; 3GPP TSG-RAN WG4 Meeting #102-e; R4-2207125; Electronic Meeting; Feb. 21-Mar. 3, 2022; pp. 1-35.

"Decision for Grant of Patent" Office Action issued in JP 2023-533597; mailed by the Japanese Patent Office on Jul. 4, 2023.

* cited by examiner

USER EQUIPMENT, NODE, AND COMMUNICATION METHOD

RELATED APPLICATION

The present application is a continuation based on PCT Application No. PCT/JP2023/014117, filed on Apr. 5, 2023. The content of which is incorporated by reference herein in their entirety.

TECHNICAL FIELD

The present disclosure relates to a user equipment, a node, and a communication method.

BACKGROUND OF INVENTION

The 3rd generation partnership project (3GPP (registered trademark), hereinafter the same), which is a standardization project for mobile communication systems, defines the technical specifications of carrier aggregation (CA). CA can be configured for a user equipment (UE) through a node of a network of a mobile communication system (also simply referred to as a "node").

In CA, a plurality of component carriers (CCs) corresponding to a plurality of serving cells are aggregated, enabling the UE to simultaneously receive or transmit over the plurality of CCs (plurality of cells). The plurality of CCs may be contiguous or non-contiguous in the frequency domain. One serving cell is referred to as a primary cell (PCell) and one or more secondary cells (SCells) are configured for the UE together with the PCell to form a set of serving cells.

When CA has been configured, the UE has one radio resource control (RRC) connection to the network. SCells can be added and deleted through RRC signaling. SCells can be activated and deactivated through a medium access control (MAC) control element (CE).

CA is generally configured and activated with the following procedure. First, the UE transmits a measurement report message including a radio quality measurement result of each cell to a node. Second, the node configures SCells for the UE using an RRC message based on the measurement report message. Third, the node activates the SCells of the UE using a MAC CE. Activation of an SCell causes the SCell to transition from an inactive state to an active state, enabling wireless communication using the SCell.

Such three-step control poses the problem that it is difficult to shorten a time period from when radio quality corresponding to an SCell in the UE has improved to when wireless communication using the SCell becomes possible.

CITATION LIST

Patent Literature

Non-Patent Document 1: 3GPP Technical Specification: TS 38.300 V17.3.0 (2022-12)

SUMMARY

A user equipment according to a first aspect is an apparatus for performing wireless communication with a node using carrier aggregation in a mobile communication system. The user equipment includes a receiver that receives, from the node, information indicating a radio quality condition that is to be met for the user equipment to perform an activation process for a secondary cell configured for the user equipment, and a controller that measures radio quality and evaluate whether the radio quality condition is met. The controller performs the activation process for the secondary cell in response to the radio quality condition being met.

A node according to a second aspect is a node for performing wireless communication with a user equipment using carrier aggregation in a mobile communication system. The node includes a controller that configures a secondary cell for the user equipment, and a transmitter that transmits, to the user equipment, information indicating a radio quality condition that is to be met for the user equipment to perform an activation process for the secondary cell.

A communication method according to a third aspect is a method used in a user equipment that performs wireless communication with a node using carrier aggregation in a mobile communication system. The communication method includes receiving, from the node, information indicating a radio quality condition that is to be met for the user equipment to perform an activation process for a secondary cell configured for the user equipment, measuring radio quality and evaluating whether the radio quality condition is met, and performing the activation process for the secondary cell in response to the radio quality condition being met. A communication method according to a fourth aspect is a method used in a node that performs wireless communication with a user equipment using carrier aggregation in a mobile communication system. The communication method includes configuring a secondary cell for the user equipment and transmitting, to the user equipment, information indicating a radio quality condition that is to be met for the user equipment to perform an activation process for the secondary cell.

DESCRIPTION OF EMBODIMENTS

Figure 1:
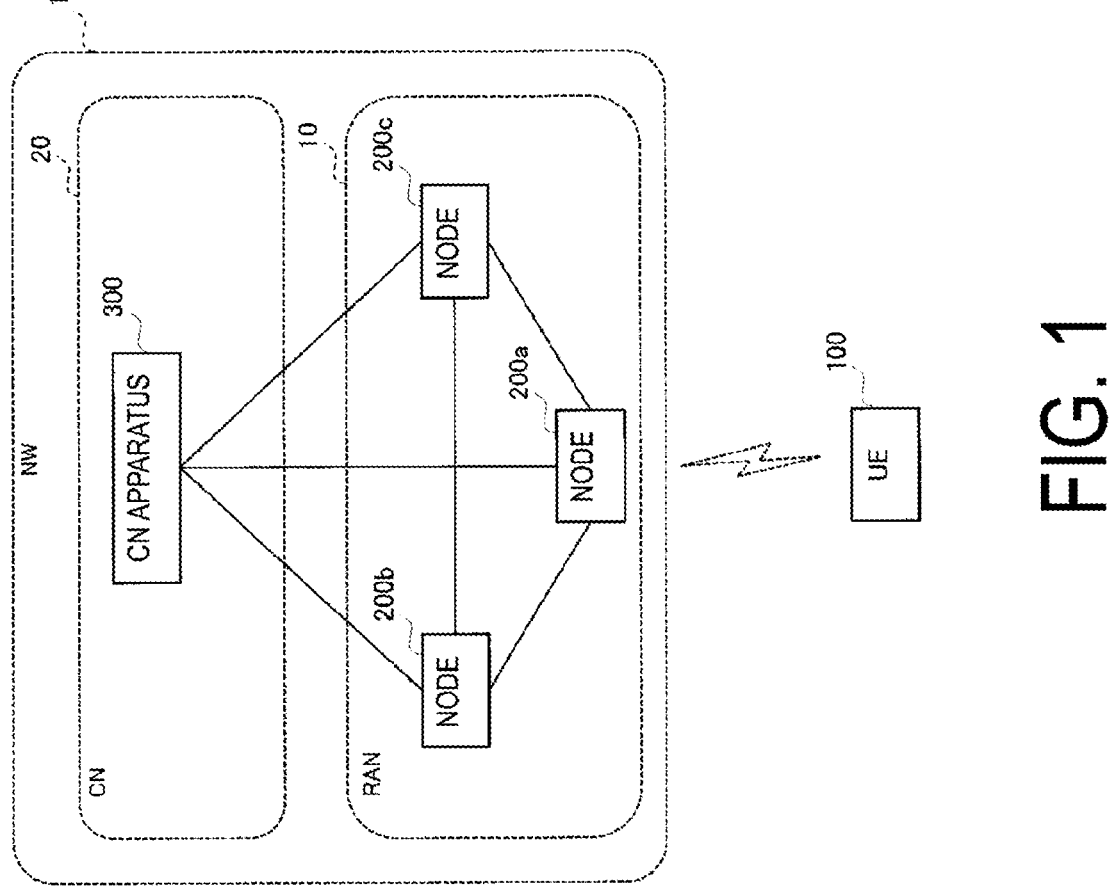
FIG. 1 is a diagram illustrating a configuration example of a mobile communication system according to an embodiment.

A mobile communication system according to embodiments will be described below with reference to the drawings. In the description of the drawings, the same or similar parts will be denoted by the same or similar reference numerals.

(1) First Embodiment

A first embodiment will be described with reference to FIGS. 1 to 9.

(1.1) Configuration Example of System

FIG. 1 is a diagram illustrating a configuration example of a mobile communication system according to the embodiment. The mobile communication system according to the embodiment is a system conforming to the 3GPP standard. For example, the mobile communication system according to the embodiment may be a 5th Generation (5G) System or a 6th Generation (6G) System.

The mobile communication system includes a network (NW) 1 and a user equipment (UE) 100. The UE 100 is a mobile communication apparatus and performs wireless communication with the NW 1. The UE 100 may be an apparatus used by a user and may be, for example, a mobile phone terminal (including a smartphone), a tablet terminal, a laptop personal computer (PC), a communication module (including a communication card or chipset), a sensor or an apparatus provided in a sensor, a vehicle or an apparatus provided in a vehicle (a vehicle UE), an aircraft or an apparatus provided in an aircraft (an aerial UE).

The NW 1 includes a radio access network (RAN) 10 and a core network (CN) 20. When the mobile communication system is a 5th Generation System (5GS), the RAN 10 is called a Next Generation Radio Access Network (NG-RAN) and the CN 20 is called a 5G Core Network (5GC).

The RAN 10 includes a plurality of nodes 200 (nodes 200a to 200c in the illustrated example). The nodes 200 are connected to each other via inter-node interfaces. The nodes 200 are also called base stations. Each node 200 may include (i.e., be functionally divided into) a Central Unit (CU) and a Distributed Unit (DU), and the two units may be connected through a fronthaul interface. When the mobile communication system is a 5GS, the nodes 200 are called gNBs, the inter-node interfaces are called Xn interfaces, and the fronthaul interface is called an F1 interface.

Each node 200 manages one or more cells. The node 200 performs wireless communication with the UE 100 that has established connections to the cells of the node 200. Each node 200 has a radio resource management (RRM) function, a user data (also simply referred to as "data") routing function, a measurement control function for mobility control/scheduling, and the like. Note that a "cell" is used as a term indicating a minimum unit of a wireless communication area. A "cell" is also used as a term indicating a function or resource for wireless communication with the UE 100. One cell belongs to one carrier frequency (also simply referred to as one "frequency").

The CN 20 includes a CN apparatus 300. The CN apparatus 300 may include a control plane (C-plane) apparatus corresponding to a C-plane and a user plane (U-plane) apparatus corresponding to a U-plane. The C-plane apparatus performs various mobility control, paging, and the like for the UE 100. The C-plane apparatus communicates with the UE 100 using Non-Access Stratum (NAS) signaling. The U-plane apparatus performs data transfer control. When the mobile communication system is a 5GS, the C-plane apparatus is called an Access and Mobility Management Function (AMF), the U-plane apparatus is called a User Plane Function (UPF), and the interfaces between the node 200 and the CN apparatus 300 are called NG interfaces.

Figure 2:
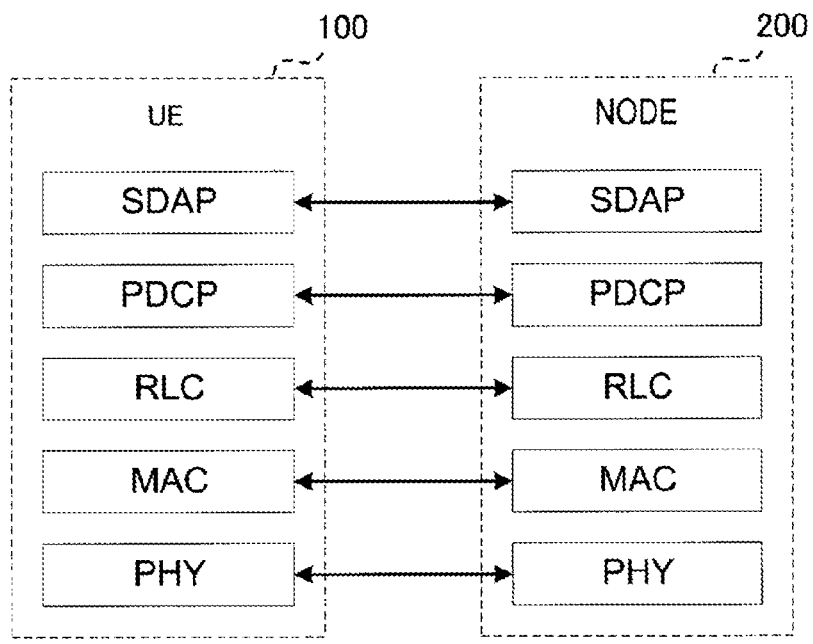
FIG. 2 is a diagram illustrating a configuration example of a radio interface protocol stack of a U-plane that handles data.

FIG. 2 is a diagram illustrating a configuration example of a radio interface protocol stack of the U-plane that handles data.

The U-plane radio interface protocols include, for example, a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs encoding/decoding, modulation/demodulation, antenna mapping/demapping, and resource mapping/demapping. Data and control information is transferred between the PHY layer of the UE 100 and the PHY layer of the node 200 via a physical channel. The PHY layer of the UE 100 receives downlink control information (DCI) transmitted from the node 200 over a physical downlink control channel (PDCCH). Specifically, the UE 100 blind decodes the PDCCH using a radio network temporary identifier (RNTI) and acquires successfully decoded DCI as DCI addressed to the UE 100. The DCI transmitted from the node 200 is appended with CRC parity bits scrambled by the RNTI.

The MAC layer performs data priority control, retransmission processing through hybrid ARQ (HARQ), and the like. Data and control information is transferred between the MAC layer of the UE 100 and the MAC layer of the node 200 via a transport channel. The MAC layer of the node 200 includes a scheduler. The scheduler determines uplink and downlink transport formats (transport block sizes and modulation and coding schemes (MCSs)) and resources allocated to the UE 100.

The RLC layer transfers data to the RLC layer of the receiving side using the functions of the MAC layer and the PHY layer. Data and control information is transferred between the RLC layer of the UE 100 and the RLC layer of the node 200 via a logical channel.

The PDCP layer performs header compression/decompression, encryption/decryption, and the like.

The SDAP layer performs mapping between an IP flow which is the unit in which the CN 20 performs QoS control and a radio bearer which is the unit in which an Access Stratum (AS) performs QoS control. Note that the SDAP need not be present when the RAN is connected to an EPC.

Figure 3:
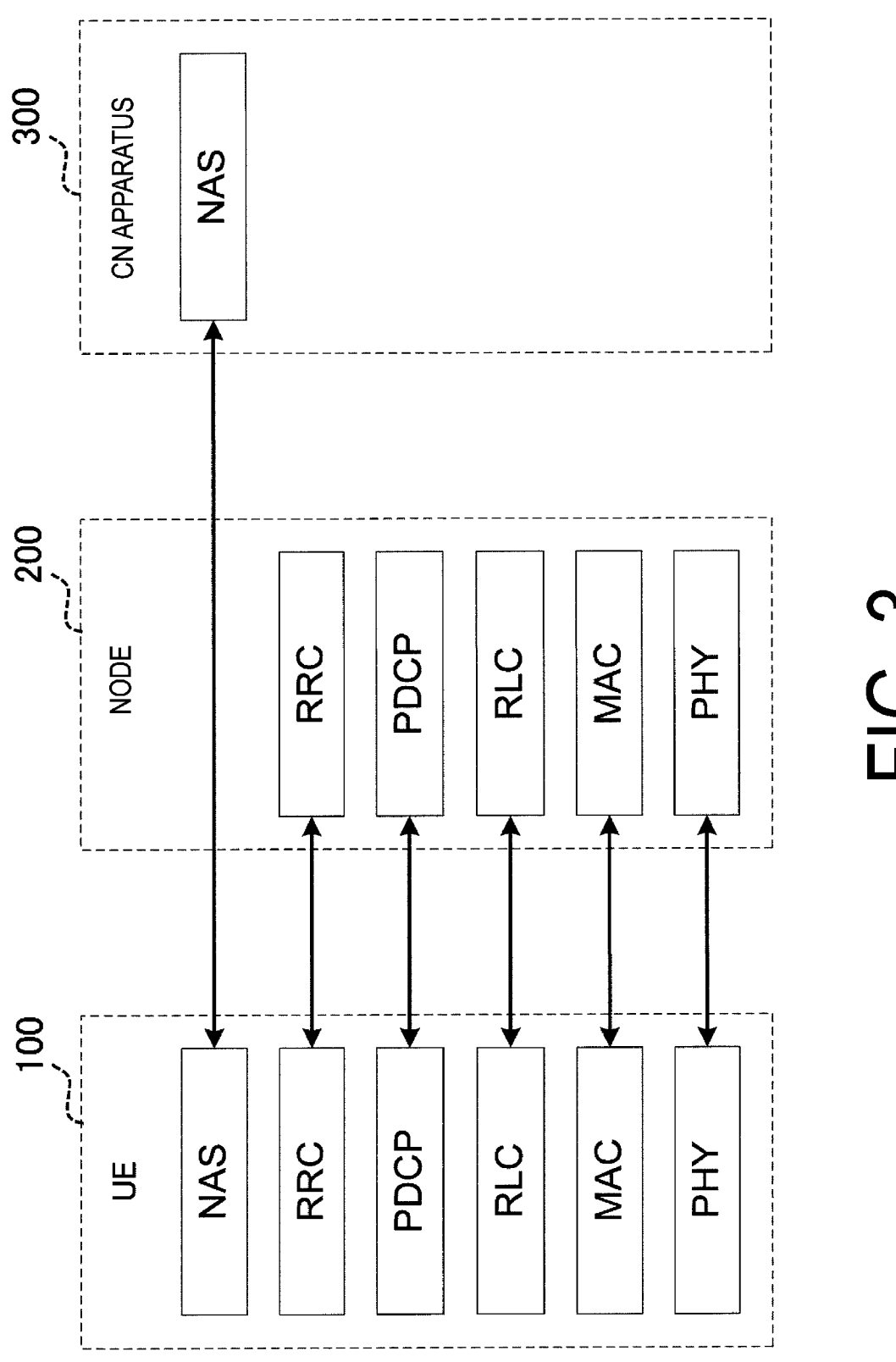
FIG. 3 is a diagram illustrating a configuration example of a radio interface protocol stack of a C-plane that handles signaling (control signals).

FIG. 3 is a diagram illustrating a configuration example of a radio interface protocol stack of the C-plane that handles signaling (control signals).

The radio interface protocol stack of the C-plane includes, for example, a Radio Resource Control (RRC) layer and a Non-Access Stratum (NAS) layer instead of the SDAP layer illustrated in FIG. 2.

RRC signaling for various configurations is transferred between the RRC layer of the UE 100 and the RRC layer of the node 200. The RRC layer controls logical, transport, and physical channels in response to establishment, re-establishment, and release of radio bearers. When there is a connection between the RRC of the UE 100 and the RRC of the node 200 (RRC connection), the UE 100 is in an RRC connected state. When there is no connection between the RRC of the UE 100 and the RRC of the node 200 (RRC connection), the UE 100 is in an RRC idle state. When the connection between the RRC of the UE 100 and the RRC of the node 200 is suspended, the UE 100 is in an RRC inactive state.

The NAS layer (also simply referred to as a "NAS") located above the RRC layer performs session management, mobility management, and the like. NAS signaling is transferred between the NAS layer of the UE 100 and the NAS layer of the CN apparatus 300. Note that the UE 100 includes an application layer in addition to the radio interface protocols. Each layer lower than the NAS layer is referred to as an AS layer (also simply referred to as an "AS").

(1.2) CA Using Terahertz Wave Cells

Figure 4:
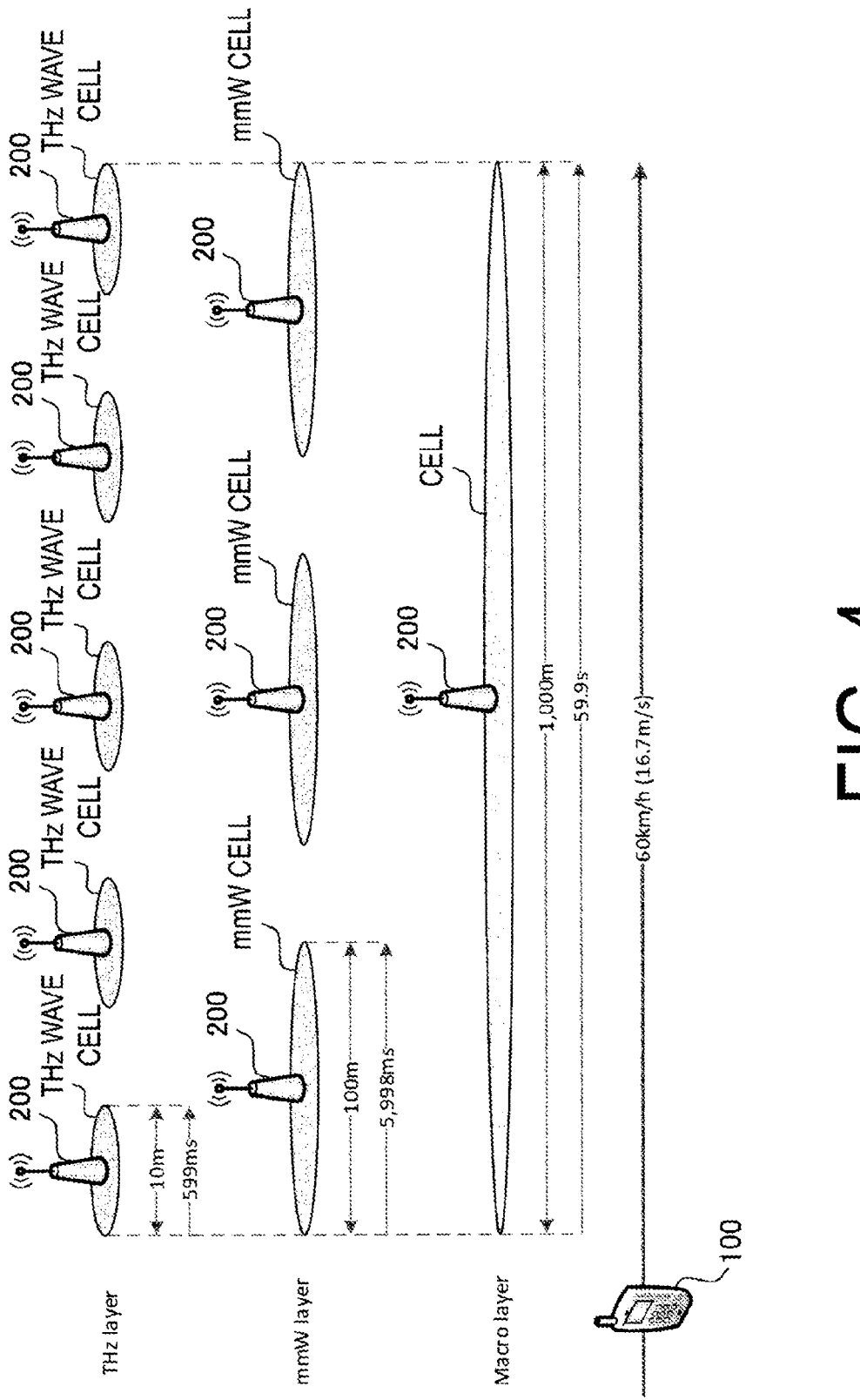
FIG. 4 is a diagram for explaining terahertz (THz) wave cells according to the embodiment.

FIG. 4 is a diagram for explaining terahertz (THz) wave cells according to the embodiment.

A mobile communication system according to the embodiment may be a 6G system. 6G is expected to utilize terahertz (THz) waves. A cell that operates with THz waves is called a THz wave cell. Compared to millimeter waves (mmW), THz waves have higher propagation, higher free space loss, and are more susceptible to the effects of the atmosphere and rainfall. Thus, THz wave cells can be ultra-compact size cells.

In the illustrated example, the diameter of the coverage area of a THz wave cell is about 10 m, the diameter of the coverage area of a mmW cell that operates with mmW is about 100 m, and the diameter of the coverage area of a macro cell is about 1000 m. Under this assumption, the UE 100 which is moving at, for example, 60 km/s passes through the coverage area of each THz wave cell in about 599 ms.

Carrier aggregation (CA) is one method for reliably controlling compact size cells in a mobile communication system. In the embodiment, it is assumed that THz wave cells are used as secondary cells (SCells) of CA. It is assumed that a primary cell (PCell) of CA is a macro cell, but the PCell may be a mmW cell.

Figure 5:
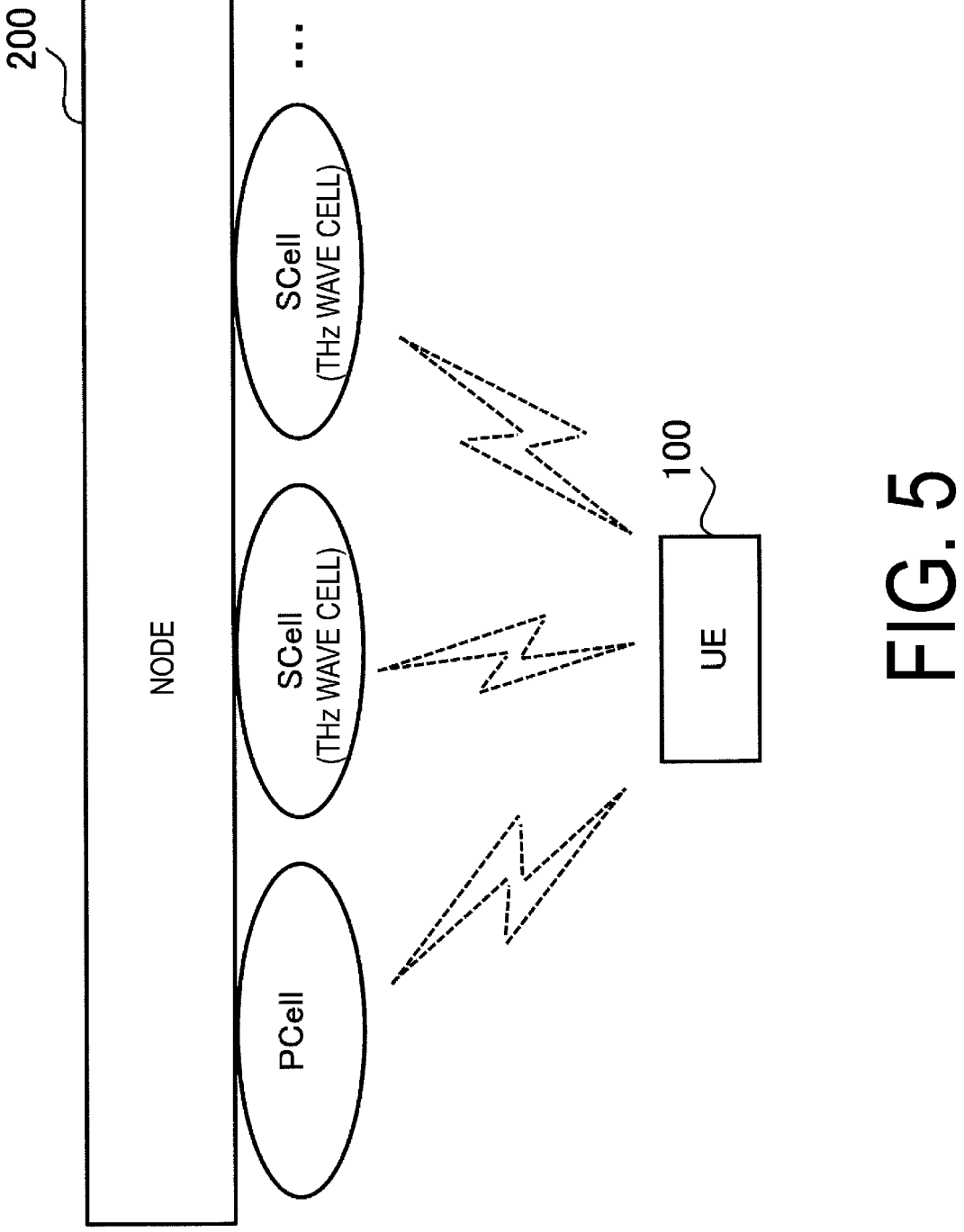
FIG. 5 is a diagram for explaining carrier aggregation (CA) according to the embodiment.

FIG. 5 is a diagram for explaining carrier aggregation (CA) according to the embodiment.

CA can be configured for the UE 100, which is in an RRC connected state, through the node 200. In CA, a plurality of component carriers (CCs) corresponding to a plurality of serving cells are aggregated, enabling the UE to simultaneously receive or transmit over the plurality of CCs (plurality of cells). The plurality of CCs may be contiguous or non-contiguous in the frequency domain. One serving cell is referred to as a primary cell (PCell) and one or more secondary cells (SCells) are configured for the UE together with the PCell to form a set of serving cells. When CA has been configured, the UE 100 has one RRC connection to the network 1. SCells can be added and deleted through RRC signaling. SCells can be activated and deactivated through a medium access control (MAC) control element (CE).

The mobile communication system supports activation and deactivation of cells to enable a reduction in the power consumption of the UE 100 when CA has been configured. When an SCell is inactive, the UE 100 does not need to receive a PDCCH or a physical downlink shared channel (PDSCH) over the SCell and cannot perform uplink transmission over the SCell. The UE 100 also does not need to perform channel quality indicator (CQI) measurement for the inactive SCell. On the other hand, when an SCell is active, the UE 100 receives a PDSCH and a PDCCH over the SCell. The UE 100 can perform CQI measurement for the active SCell.

Note that when reconfiguring a set of serving cells, the node 200 first activates or deactivates SCells added to the set and does not change the activation state (active or inactive state) of SCells remaining in the set (which have not been changed or reconfigured).

Figure 6:
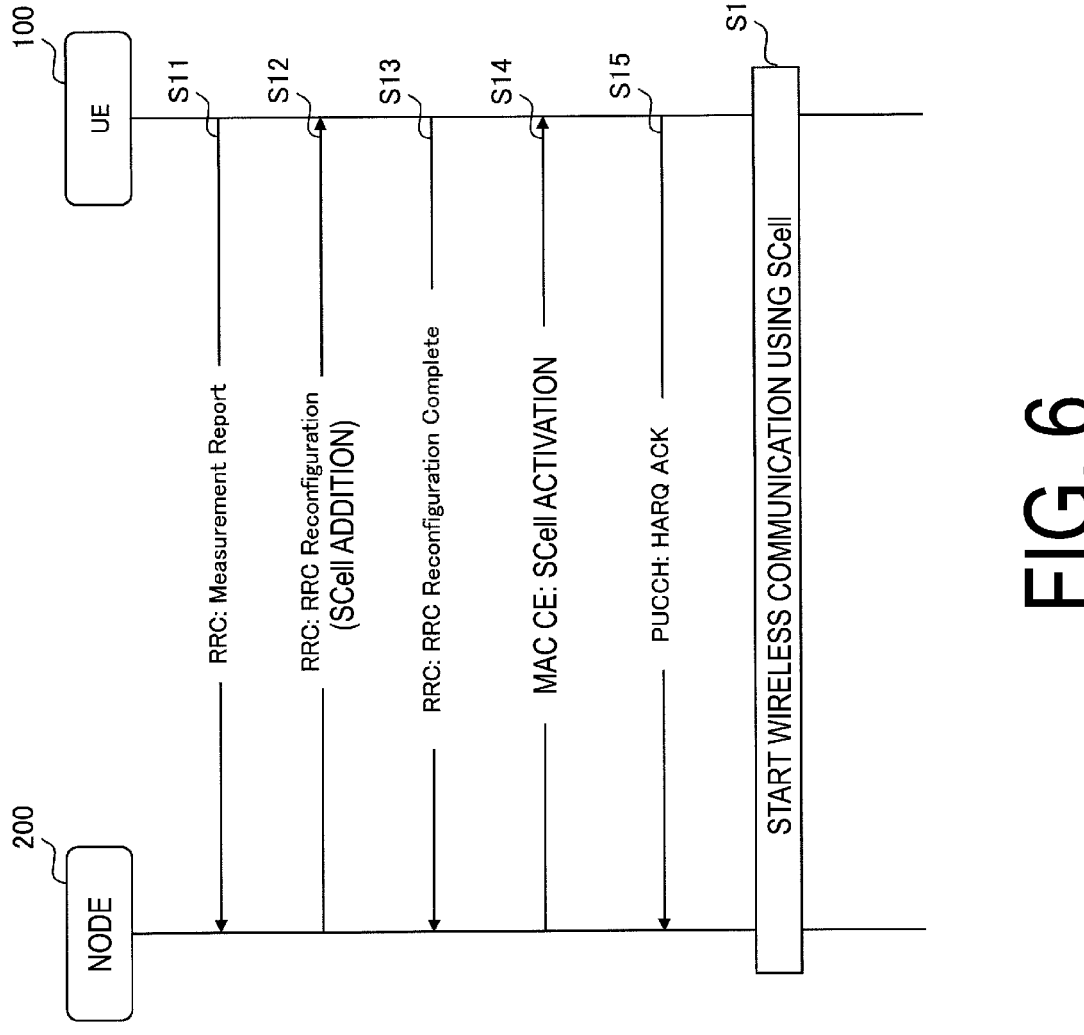
FIG. 6 is a diagram illustrating a general procedure for adding and activating secondary cells (SCells).

FIG. 6 is a diagram illustrating a general procedure for adding and activating SCells.

In step S11, the UE 100 transmits a Measurement Report message including the radio quality measurement result of each cell to the node 200, for example, over the PCell. The radio quality is, for example, at least one selected from the group consisting of Reference Signal Received Power (RSRP), Reference Signal Received Quality (RSRQ), and Signal to Interference & Noise Ratio (SINR). The Measurement Report message is an RRC message transmitted and received in the RRC layer. The Measurement Report message may be transmitted periodically or by an event trigger. The node 200 receives the Measurement Report Message.

In step S12, the node 200 determines to configure (add) the SCell for the UE 100 based on the Measurement Report message and transmits, to the UE 100, an RRC Reconfiguration message for adding the SCell to the UE 100, for example, over the PCell. The RRC Reconfiguration message is transmitted and received in the RRC layer. The UE 100 receives the RRC Reconfiguration message.

In step S13, the UE 100 transmits an RRC Reconfiguration Complete message indicating completion of adding the SCell based on the RRC Reconfiguration message to the node 200, for example, over the PCell. The RRC Reconfiguration Complete message is transmitted and received in the RRC layer. The node 200 receives the RRC Reconfiguration Complete message. At this stage, the added SCell is inactive.

In step S14, the node 200 transmits, to the UE 100, a MAC CE for activating the SCell added to the UE 100, for example, over the PCell. The MAC CE is transmitted and received in the MAC layer. The UE 100 starts activating the SCell upon receiving the MAC CE. Upon starting the activation of the SCell, the UE 100 receives a reference signal of the SCell and performs channel state information (CSI) measurement, automatic gain control (AGC), and beam management to prepare for communication.

In step S15, the UE 100 transmits a HARQ ACK indicating successful reception of the MAC CE to the node 200, for example, over a PUCCH of the PCell. The node 200 receives the HARQ ACK.

In step S16, the UE 100 and the node 200 start wireless communication using the SCell when the SCell has become active in the UE 100.

According to such a procedure, it takes, for example, about 35 ms until the UE 100 is able to use the SCell after the radio quality of the SCell becomes fit for communication. When the SCell is a THz wave cell, the coverage area of the SCell is even narrower due to the influence of shielding or the like and thus the available time of the SCell is shorter. Therefore, in the procedure of FIG. 6, it takes a long time until the activation of the SCell is completed, posing the problem that the time during which data can actually be transmitted and received over the SCell is short.

Here, the following extended functions have been introduced up to Release 17 of the 3GPP standard as techniques capable of speeding up SCell activation.

A first extended function is direct SCell activation. In direct SCell activation, the node 200 can designate the initial state of an SCell as an active state when adding the SCell to the UE 100 using an RRC message. This eliminates the need to transmit and receive the MAC CE for SCell activation in FIG. 6 and thus can speed up SCell activation.

A second extended function is a technique called dormant BWP. The node 200 can configure dormant bandwidth parts (BWPs) for SCells. If an active BWP for an activated SCell is a dormant BWP, the UE 100 stops PDCCH monitoring and sounding reference signal (SRS)/PUSCH/PUCCH transmission over the SCell, but continues the execution of CSI measurement, AGC, and beam management. PDCCH/ downlink control information (DCI) is used to control entering and leaving a dormant BWP for the SCell. Note that the dormant BWP is one of dedicated BWPs of the UE 100 that the network 1 has configured via dedicated RRC signaling. An example using dormant BWPs will be described in a second embodiment.

A third extended function is a method of configuring, for an SCell, an aperiodic CSI-RS for tracking (synchronization) for fast SCell activation. Such an aperiodic CSI-RS can support AGC and time/frequency synchronization. A MAC CE is used to trigger (start) SCell activation and trigger an aperiodic CSI-RS for a deactivated SCell.

However, these extended functions have room for improvement to further speed up SCell activation. Note that it is possible to eliminate delays associated with activation by keeping SCells in the active state in advance before the radio quality of the SCells meets a predetermined level of quality, but this poses the problem that the power consumption of the UE 100 increases. Thus, a method is preferred that can deactivate an SCell when the radio quality of the SCell does not meet a predetermined level of quality and can quickly activate the SCell when the radio quality of the SCell meets the predetermined level of quality.

(1.3) Configuration Example of User Equipment

Figure 7:
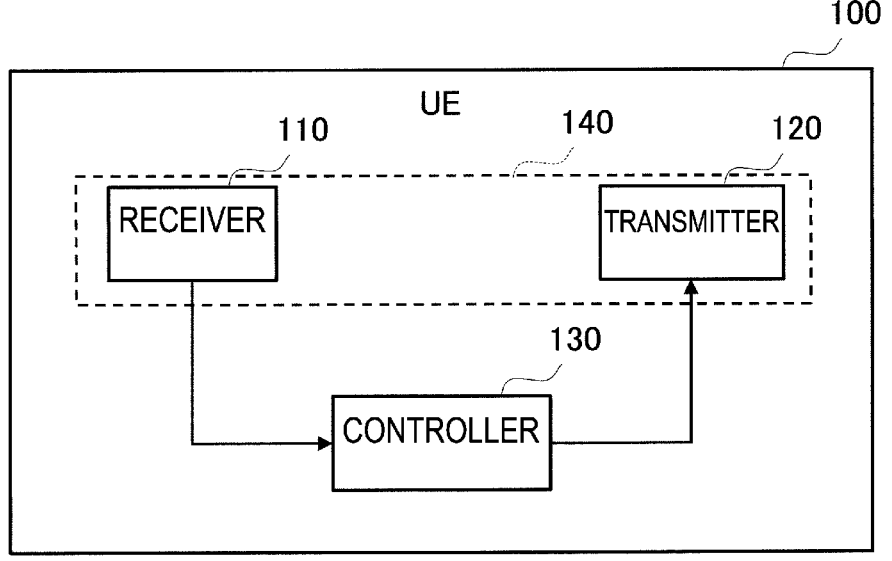
FIG. 7 is a diagram illustrating a configuration example of a user equipment (UE) according to the embodiment.

FIG. 7 is a diagram illustrating a configuration example of the UE 100 (user equipment) according to the embodiment.

The UE 100 includes a receiver 110, a transmitter 120, and a controller 130. The receiver 110 and the transmitter 120 constitute a wireless communicator 140 that performs wireless communication with the node 200.

The receiver 110 performs various types of reception under the control of the controller 130. The receiver 110 includes an antenna and a reception device. The reception device converts a radio signal received through the antenna into a baseband signal (reception signal) and outputs the baseband signal to the controller 130. The transmitter 120 performs various types of transmission under the control of the controller 130. The transmitter 120 includes an antenna and a transmission device. The transmission device converts a baseband signal (transmission signal) output from the controller 130 into a radio signal and transmits the radio signal through the antenna.

The controller 130 performs various types of control and processes in the UE 100. The operations of the UE 100 described above and below may also be performed under the control of a controller 230. The controller 130 includes at least one processor and at least one memory. The memory stores programs executed by the processor and information used for processing by the processor. The processor may include a baseband processor and a Central Processing Unit (CPU). The baseband processor performs modulation/demodulation, encoding/decoding, or the like on the baseband signal. The CPU executes the programs stored in the memory to perform various processes.

The UE 100 configured as such performs wireless communication with the node 200 using CA. The receiver 110 receives, from the node 200, information indicating a radio quality condition that is to be met for the UE 100 to perform an activation process for each SCell configured for the UE 100. The controller 130 measures radio quality of the SCell and evaluates whether the radio quality condition is met. The controller 130 performs an activation process for the SCell in response to the radio quality condition being met.

This allows the UE 100 to autonomously perform an activation process for an SCell when the radio quality of the SCell meets the radio quality condition (the predetermined level of quality). On the other hand, in the related art, the node 200 needs to identify that the radio quality of an SCell meets a radio quality condition (a predetermined level of quality) based on a Measurement Report message and instruct the UE 100 to activate the SCell and/or switch a dormant BWP to a non-dormant state (cause a dormant BWP to leave a dormant state).

In the embodiment, a radio quality condition is configured for the UE 100 and the UE 100 can determine whether the radio quality condition is met, such that the UE 100 can autonomously perform an activation process for the SCell without transmitting a Measurement Report message to the node 200. Thus, it is possible to further speed up SCell activation.

In the first embodiment, the activation process includes a process for transitioning the SCell from an inactive state to an active state. The activation process may also include a process of causing a dormant BWP in the SCell to leave the dormant state. An example using dormant BWPs will be described in the second embodiment.

In the embodiment, the transmitter 120 transmits a notification regarding the activation process to the node 200 in response to the radio quality condition being met. Thus, based on the notification, the node 200 can determine that the UE 100 will perform an activation process. Therefore, wireless communication using the activated SCell can be started smoothly.

In the embodiment, the transmitter 120 transmits a notification regarding the activation process to the node 200 over the PCell. Thus, the notification can be transmitted to the node 200 before activation of the SCell is completed. Therefore, wireless communication using the activated SCell can be started smoothly and quickly.

(1.4) Configuration Example of Node

Figure 8:
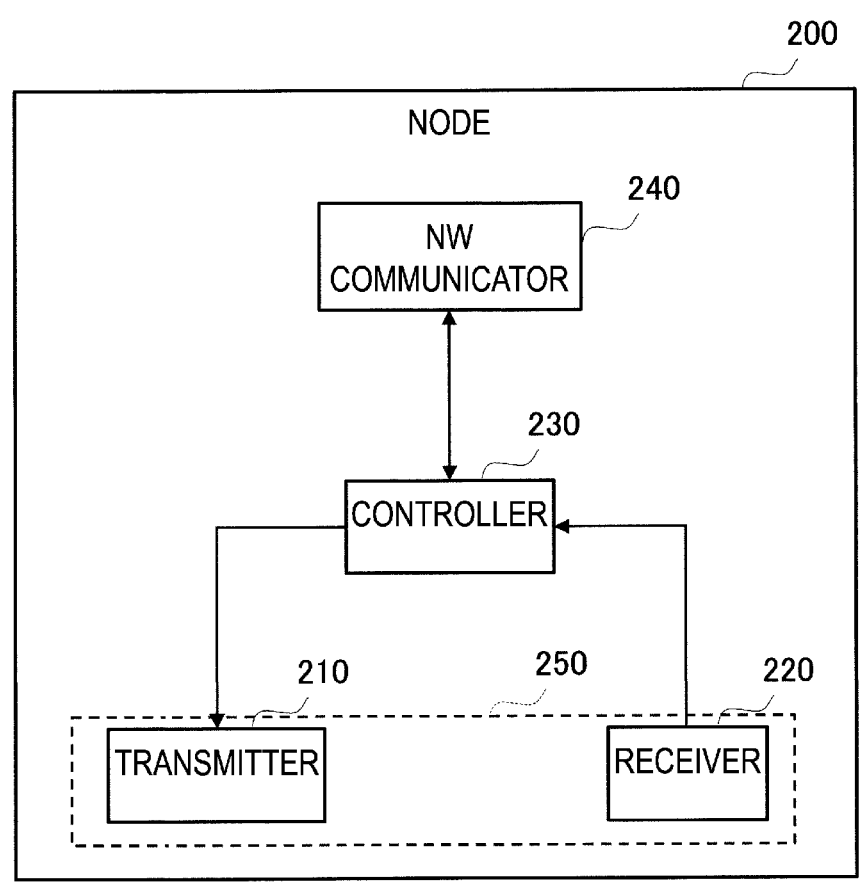
FIG. 8 is a diagram illustrating a configuration example of a node according to the embodiment.

FIG. 8 is a diagram illustrating a configuration example of the node 200 (base station) according to the embodiment.

The node 200 includes a transmitter 210, a receiver 220, the controller 230, and a NW communicator 240. The transmitter 210 and the receiver 220 constitute a wireless communicator 250 that performs wireless communication with the UE 100.

The transmitter 210 performs various types of transmission under the control of the controller 230. The transmitter 210 includes an antenna and a transmission device. The transmission device converts a baseband signal (transmission signal) output from the controller 230 into a radio signal and transmits the radio signal through the antenna. The receiver 220 performs various types of reception under the control of the controller 230. The receiver 220 includes an antenna and a reception device. The reception device converts the radio signal received through the antenna into a baseband signal (reception signal) and outputs the baseband signal to the controller 230.

The controller 230 performs various types of control and processes in the node 200. The operations of the node 200 described above and below may also be performed under the control of the controller 230. The controller 230 includes at least one processor and at least one memory. The memory stores programs executed by the processor and information used for processing by the processor. The processor may include a baseband processor and a CPU. The baseband processor performs modulation/demodulation, encoding/decoding, or the like on the baseband signal. The CPU executes the programs stored in the memory to perform various processes.

The NW communicator 240 is connected to adjacent nodes via inter-node interfaces. The NW communicator 240 is connected to the CN apparatus 300 via a node-CN interface. The node 200 configured as such performs wireless communication with the UE 100 using CA. The controller 230 configures SCells for the UE 100. The transmitter 210 transmits to the UE 100 information indicating a radio quality condition that is to be met for the UE 100 to perform an activation process for each SCell. This allows the UE 100 to autonomously perform an activation process for an SCell when the radio quality of the SCell meets the radio quality condition (the predetermined level of quality).

In the embodiment, the receiver 220 receives a notification regarding the activation process from the UE 100 in response to the radio quality condition being met in the UE 100. For example, the receiver 220 receives the notification from the UE 100 over the PCell.

(1.5) Operation Example of System

Figure 9:
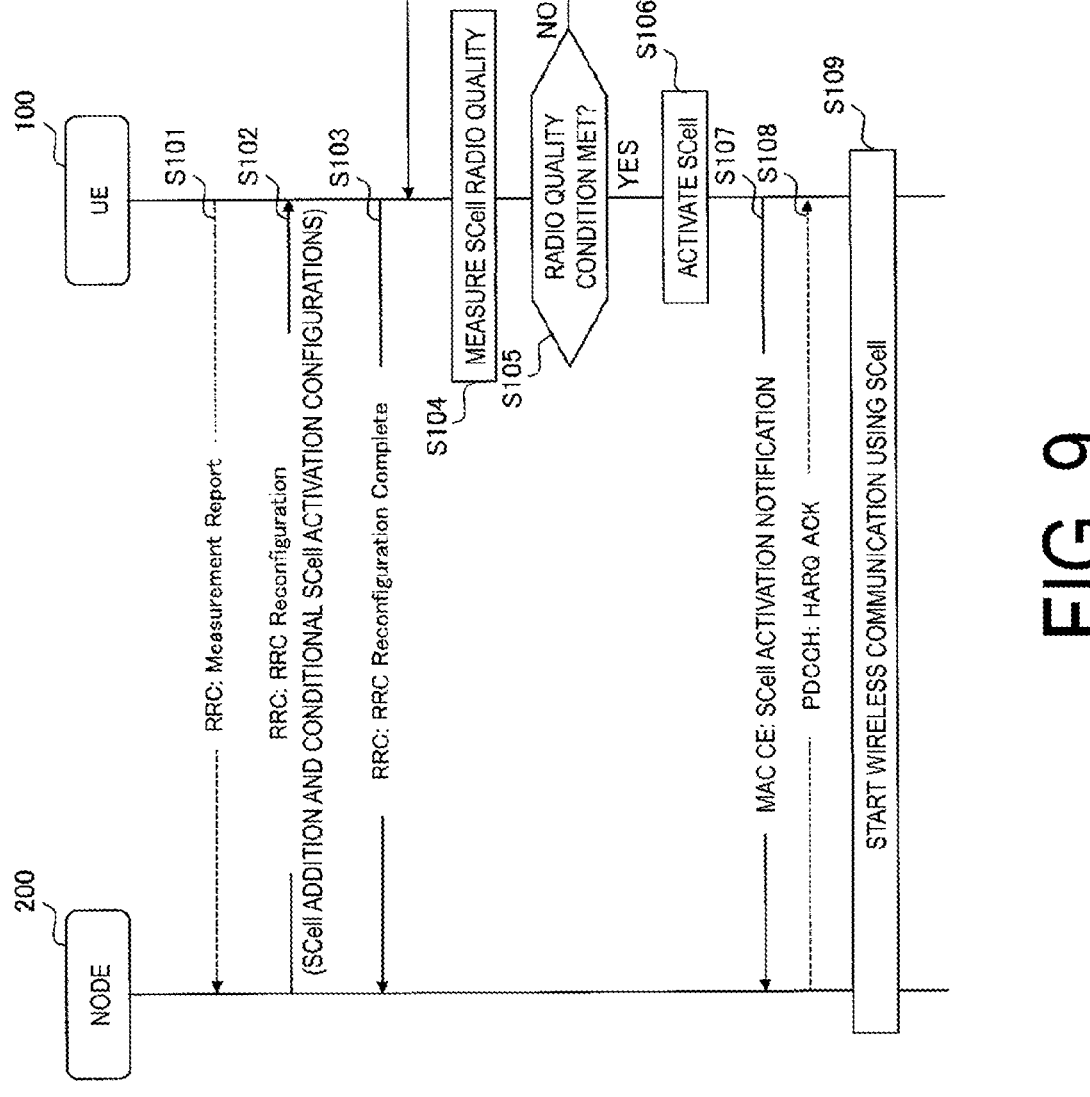
FIG. 9 is a diagram illustrating an operation example of a system according to a first embodiment.

FIG. 9 is a diagram illustrating an operation example of a system according to the first embodiment. In FIG. 9, dashed lines indicate non-essential steps. Overlapping description of operations the same as those of FIG. 6 will be omitted.

In step S101, the receiver 110 of the UE 100 receives a reference signal from each cell, the controller 130 of the UE 100 measures radio quality based on the reference signal, and the transmitter 120 of the UE 100 transmits a Measurement Report message including the measurement result to the node 200, for example, over the PCell. Here, it is assumed that the Measurement Report message includes the measurement results of THz wave cells. The receiver 220 of the node 200 receives the Measurement Report message.

In step S102, the controller 230 of the node 200 generates an RRC Reconfiguration message and the transmitter 210 of the node 200 transmits the RRC Reconfiguration message to the UE 100, for example, over the PCell. The receiver 110 of the UE 100 receives the RRC Reconfiguration message.

The RRC Reconfiguration message includes configuration information for adding SCells and configuration information for conditional SCell activation. The configuration information for adding SCells may be an sCellToAddModList which is a list of SCells to be added or changed. The sCellToAddModList is a list that has SCell configurations (SCellConfig) as entries. Each SCell configuration (SCellConfig) includes an index of the corresponding SCell (sCellIndex) and a configuration of the corresponding SCell (sCellConfigCommon and sCellConfigDedicated).

The SCell configuration (SCellConfig) may include the configuration information for conditional SCell activation. The configuration information for conditional SCell activation includes information indicating a radio quality condition that is to be met for the UE 100 to activate the corresponding SCell. The information indicating the radio quality condition may include at least one radio quality threshold value selected from the group consisting of an RSRP threshold value, an RSRQ threshold value, and an SINR threshold value.

In the first embodiment, the initial state of the SCell added to the UE 100 is the inactive state. The controller 130 of the UE 100 starts radio quality measurement for the SCell based on the configuration information for conditional SCell activation.

In step S103, the controller 130 of the UE 100 generates an RRC Reconfiguration Complete message and the transmitter 110 of the UE 100 transmits the RRC Reconfiguration Complete message to the node 200, for example, over the PCell. The receiver 220 of the node 200 receives the RRC Reconfiguration Complete message.

In step S104, the receiver 110 of the UE 100 receives a reference signal of each SCell and the controller 130 of the UE 100 measures radio quality based on the reference signal. The reference signal of the SCell may be a demodulation reference signal (DMRS) included in an SS/PBCH Block (SSB) transmitted by the SCell or may be a Tracking Reference Signal (TRS) which is a type of CSI-RS.

In step S105, the controller 130 of the UE 100 determines whether the radio quality condition configured in step S102 is met. Specifically, the controller 130 of the UE 100 compares the measurement result (RSRP, RSRQ, and/or SINR) in step S104 with the radio quality threshold value configured in step S102, and if the measurement result exceeds the radio quality threshold value, determines that the radio quality condition is met. When it is determined that the radio quality condition is not met (NO in step S105), the process returns to step S104.

On the other hand, upon determining that the radio quality condition is met (YES in step S105), the controller 130 of the UE 100 starts activating the SCell in step S106. The controller 130 of the UE 100 may perform control for establishing time/frequency synchronization with the SCell. For example, the receiver 110 of the UE 100 receives an SSB or TRS of the SCell and the controller 130 of the UE 100 establishes time/frequency synchronization using the SSB or TRS. The controller 130 of the UE 100 may also perform CSI measurement, AGC, and beam management for the SCell.

In steps S104 and S106, the node 200 may transmit the TRS over the SCell at a time (occasion) that the node 200 has configured in the UE 100 in advance and the UE 100 may wake up at the time to receive the TRS. The RRC configuration of step S102 may include information on the time (occasion).

In step S107, the controller 130 of the UE 100 triggers transmission of an SCell activation notification and the transmitter 120 of the UE 100 transmits the SCell activation notification to the node 200 over the PCell. The receiver 220 of the node 200 receives the SCell activation notification.

The SCell activation notification may be a newly introduced MAC CE. The SCell activation notification includes an index value (which may be a cell ID) of the activated SCell. However, the SCell activation notification may be a notification included in UCI transmitted over a PUCCH, may be a PDCP Control PDU, or may be a notification included in an RRC message.

Prior to transmitting the SCell activation notification, the following processes may be performed in the PHY layer and the MAC layer. Specifically, the UE 100 transmits a Scheduling Request (SR) to the node 200, the node 200 transmits a UL grant for a Buffer Status Report (BSR) to the UE 100, the UE 100 transmits a BSR to the node 200, and the node 200 transmits a UL grant for PUSCH transmission to the UE 100. The UE 100 then transmits an SCell activation notification based on the UL grant for PUSCH transmission.

Note that an example in which the UE 100 transmits the SCell activation notification to the node 200 over the PCell has been described, but the UE 100 may also transmit the SCell activation notification to the node 200 over the SCell if activation of the SCell is completed. The SCell activation notification may include an index of the activated SCell. The index may refer to each entry in the SCell configuration list configured in the RRC Reconfiguration. The cell ID of the activated SCell may be transmitted instead of the index. Alternatively, in a bitmap-like notification, each bit position may be associated with a respective SCell and each bit (0/1) may indicate whether the bit is activated.

In step S108, the transmitter 210 of the node 200 transmits a HARQ ACK indicating successful reception of the SCell activation notification to the UE 100 over a PDCCH of the PCell. The receiver 110 of the UE 100 receives the HARQ ACK. Note that step S108 need not be performed if the SCell activation notification is UCI.

The node 200 identifies that the SCell of the UE 100 has become available in response to receiving the SCell activation notification in step S107. In step S109, the node 200 performs DL transmission and/or UL granting to the UE 100 over the activated SCell and starts wireless communication (data communication) over the SCell.

(2) Second Embodiment

Figure 10:
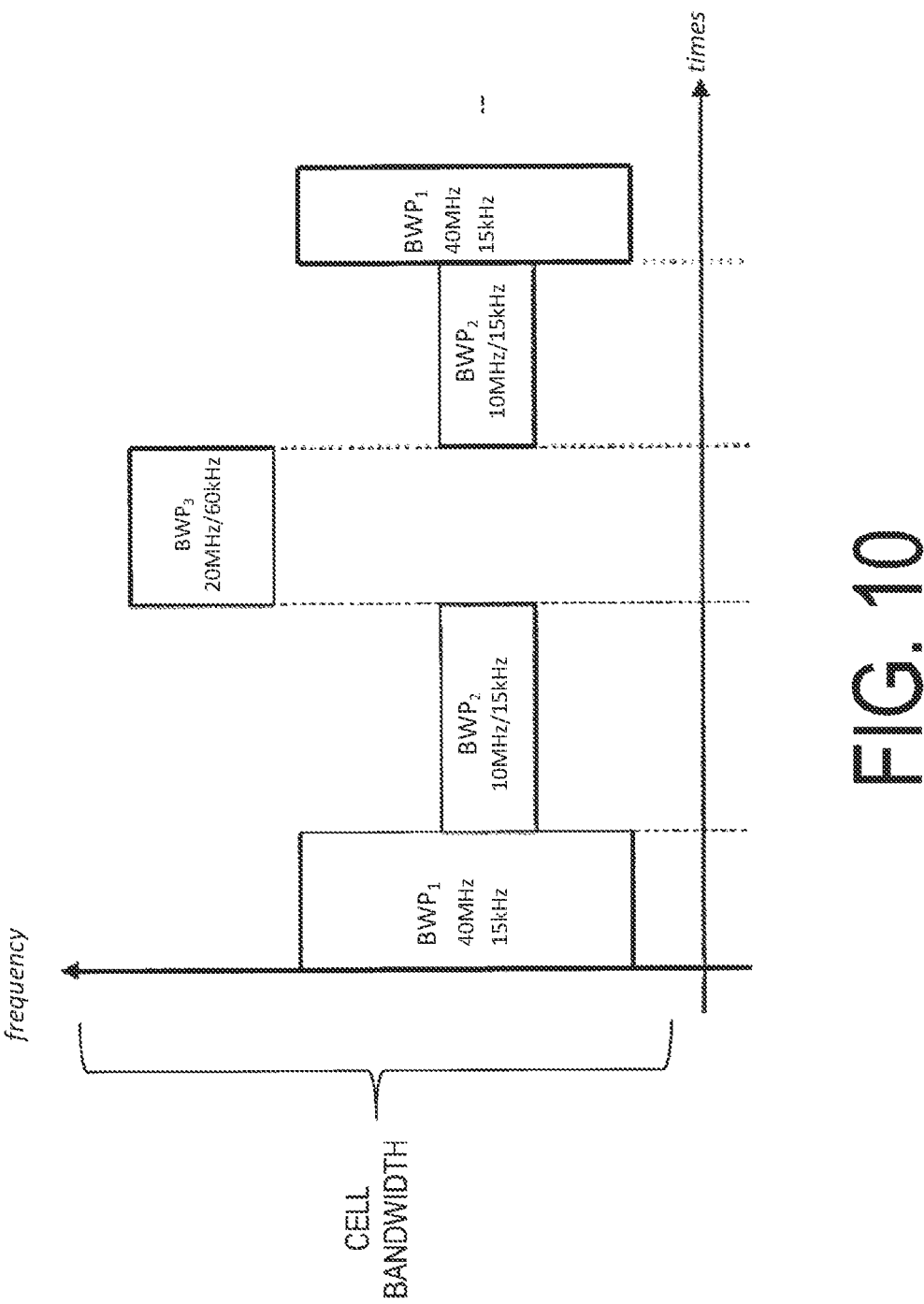
FIG. 10 is a diagram for explaining bandwidth parts (BWPs).

The second embodiment will be described with reference to FIGS. 10 and 12, focusing on differences from the first embodiment.
(2.1) BWP
FIG. 10 is a diagram for explaining BWPs.

With bandwidth adaptation (BA), the transmission and reception bandwidth of the UE 100 need not be as large as the bandwidth of the cell and can be adjusted. Parts of the cell bandwidth are called BWPs. In BA, the node 200 configures one or more BWPs in the cell for the UE 100 and informs the UE 100 which of the configured BWPs is currently active. BWPs include an initial BWP used for initial access and dedicated BWPs individually configured for the UE 100. The bandwidth and subcarrier spacing of each BWP can be variably configured.

The illustrated example illustrates an example in which three different BWPs are configured for the UE 100 and an active BWP is switched among these BWPs. BWP1 has a width of 40 MHz and a subcarrier spacing of 15 kHz, BWP2 has a width of 10 MHz and a subcarrier spacing of 15 kHz, and BWP3 has a width of 20 MHz and a subcarrier spacing of 60 kHz.

In each of the UL and DL, only one BWP is active and the rest are inactive. In inactive BWPs, the UE 100 does not monitor a PDCCH and does not transmit a PUCCH, a PRACH, and an UL-SCH.

In the case of CA, the node 200 can configure dormant BWPs for SCells. If an active BWP for an activated SCell is a dormant BWP, the UE 100 stops PDCCH monitoring and SRS/PUSCH/PUCCH transmission over the SCell, but continues the execution of CSI measurement, AGC, and beam management. A PDCCH/DCI is used to control entering and leaving a dormant BWP for the SCell. Note that the dormant BWP is one of the dedicated BWPs of the UE 100 that the node 200 has configured via dedicated RRC signaling.
(2.2) Operation Example of System
The UE 100 according to the second embodiment performs wireless communication with the node 200 using CA the same as, and/or similar to, in the first embodiment. The receiver 110 receives, from the node 200, information indicating a radio quality condition that is to be met for the UE 100 to perform an activation process for each SCell configured for the UE 100. The controller 130 measures radio quality of the SCell and evaluates whether the radio quality condition is met. The controller 130 performs an activation process for the SCell in response to the radio quality condition being met. In the second embodiment, the activation process includes a dormant leaving process for switching a dormant BWP to a non-dormant state in the SCell.

According to the second embodiment, the controller 130 of the UE 100 causes a dormant BWP for the active SCell to leave the dormant state in response to the radio quality condition configured by the node 200 being met. Thus, the UE 100 can cause a dormant BWP to leave the dormant state without transmitting a Measurement Report message to the node 200 and receiving DCI indicating leaving a dormant BWP.

Figure 11:
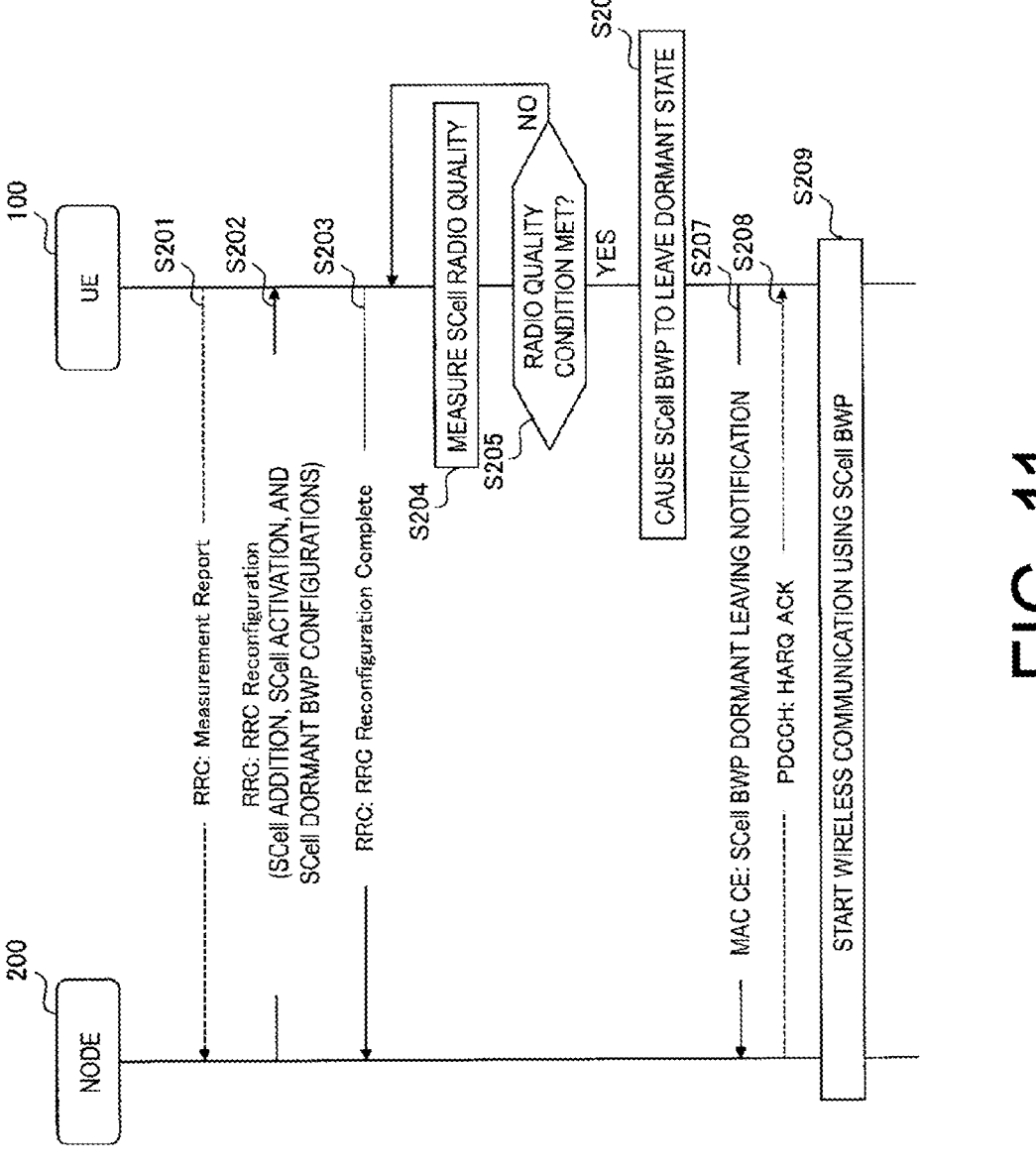
FIG. 11 is a diagram illustrating an operation example of a system according to a second embodiment.

FIG. 11 is a diagram illustrating an operation example of a system according to the second embodiment. In FIG. 11, dashed lines indicate non-essential steps. Overlapping description of operations the same as those of the first embodiment described above will be omitted.

In step S201, the receiver 110 of the UE 100 receives a reference signal from each cell, the controller 130 of the UE 100 measures radio quality based on the reference signal, and the transmitter 120 of the UE 100 transmits a Measurement Report message including the measurement result to the node 200, for example, over the PCell. Here, it is assumed that the Measurement Report message includes the measurement results of THz wave cells. The receiver 220 of the node 200 receives the Measurement Report message.

In step S202, the controller 230 of the node 200 generates an RRC Reconfiguration message and the transmitter 210 of the node 200 transmits the RRC Reconfiguration message to the UE 100, for example, over the PCell. The receiver 110 of the UE 100 receives the RRC Reconfiguration message.

The RRC Reconfiguration message includes configuration information for adding SCells, configuration information for designating the initial state of the SCell as an active state, configuration information for configuring a BWP (a dedicated BWP) for the SCell, configuration information for setting the BWP to a dormant state, and configuration information for conditionally leaving the dormant BWP. The configuration information for adding SCells may be an sCellToAddModList which is a list of SCells to be added or changed. The sCellToAddModList is a list that has SCell configurations (SCellConfig) as entries. Each SCell configuration (SCellConfig) includes an index of the corresponding SCell (sCellIndex) and a configuration of the corresponding SCell (sCellConfigCommon and sCellConfigDedicated).

The SCell configuration (SCellConfig) may include the configuration information for designating the initial state of the SCell as an active state, the configuration information for configuring a BWP (a dedicated BWP) for the SCell, the configuration information for configuring the BWP to a dormant state, and the configuration information for conditionally leaving the dormant BWP.

The configuration information for conditionally leaving the dormant BWP includes information indicating, when the active BWP of the corresponding active SCell is a dormant BWP, a radio quality condition that is to be met to terminate (leave) the dormant state of the corresponding BWP. The information indicating the radio quality condition may include at least one radio quality threshold value selected from the group consisting of an RSRP threshold value, an RSRQ threshold value, and an SINR threshold value.

In the second embodiment, the initial state of the active BWP of the SCell added to the UE 100 is the dormant state. The controller 130 of the UE 100 starts radio quality measurement for the SCell based on the configuration information for conditionally leaving the dormant BWP.

In step S203, the controller 130 of the UE 100 generates an RRC Reconfiguration Complete message and the transmitter 110 of the UE 100 transmits the RRC Reconfiguration Complete message to the node 200, for example, over the PCell. The receiver 220 of the node 200 receives the RRC Reconfiguration Complete message.

In step S204, the receiver 110 of the UE 100 receives a reference signal of each SCell and the controller 130 of the UE 100 measures radio quality based on the reference signal. The reference signal of the SCell may be a DMRS included in an SSB transmitted by the SCell or may be a TRS.

In step S205, the controller 130 of the UE 100 determines whether the radio quality condition configured in step S202 is met. Specifically, the controller 130 of the UE 100 compares the measurement result (RSRP, RSRQ, and/or SINR) in step S204 with the radio quality threshold value configured in step S202, and if the measurement result exceeds the radio quality threshold value, determines that the radio quality condition is met. When it is determined that the radio quality condition is not met (NO in step S205), the process returns to step S204.

On the other hand, upon determining that the radio quality condition is met (YES in step S205), the controller 130 of the UE 100 terminates (leaves) the dormant BWP of the SCell (i.e., switches the dormant BPW to a non-dormant state) in step S206.

In steps S204 and S206, the node 200 may transmit the TRS over the SCell at a time (occasion) that the node 200 has configured in the UE 100 in advance and the UE 100 may wake up at the time to receive the TRS. The RRC configuration of step S202 may include information on the time (occasion).

In step S207, the controller 130 of the UE 100 triggers transmission of an SCell BWP dormant leaving notification and the transmitter 120 of the UE 100 transmits the SCell BWP dormant leaving notification to the node 200 over the PCell. The receiver 220 of the node 200 receives the SCell BWP dormant leaving notification.

The SCell BWP dormant leaving notification may be a newly introduced MAC CE. The SCell BWP dormant leaving notification includes an index value (which may be a cell ID) of the SCell which has terminated the dormant BWP and/or a BWP ID of the BWP. However, the SCell BWP dormant leaving notification may be a notification included in UCI transmitted over a PUCCH, may be a PDCP Control PDU, or may be a notification included in an RRC message.

Prior to transmitting the SCell BWP dormant leaving notification, the following processes may be performed in the PHY layer and the MAC layer. Specifically, the UE 100 transmits a Scheduling Request (SR) to the node 200, the node 200 transmits a UL grant for a Buffer Status Report (BSR) to the UE 100, the UE 100 transmits a BSR to the node 200, and the node 200 transmits a UL grant for PUSCH transmission to the UE 100. The UE 100 then transmits an SCell BWP dormant leaving notification based on the UL grant for PUSCH transmission.

Note that an example in which the UE 100 transmits the SCell BWP dormant leaving notification to the node 200 over the PCell has been described, but the UE 100 may also transmit the SCell BWP dormant leaving notification to the node 200 over the SCell.

In step S208, the transmitter 210 of the node 200 transmits a HARQ ACK indicating successful reception of the SCell BWP dormant leaving notification to the UE 100 over a PDCCH of the PCell. The receiver 110 of the UE 100 receives the HARQ ACK. Note that step S208 need not be performed if the SCell BWP dormant leaving notification is UCI.

The node 200 identifies that the active BWP of the SCell of the UE 100 has become available in response to receiving the SCell BWP dormant leaving notification in step S207. In step S209, the node 200 performs DL transmission and/or UL granting to the UE 100 over the activated BWP of the SCell and starts wireless communication (data communication) over the activated BWP of the SCell.

(3) Third Embodiment

A third embodiment will be described with reference to FIG. 12, focusing on differences from the embodiments described above. The third embodiment is an embodiment based on the first embodiment described above. However, the third embodiment may also be an embodiment based on the second embodiment described above.

In the third embodiment, the controller 130 of the UE 100 completes activating the SCell (i.e., makes the SCell ready for data communication) within a predetermined time period from the time of transmitting an SCell activation notification or from the time of receiving a positive acknowledgment (HARQ ACK) to the SCell activation notification from the node 200. On the other hand, the controller 230 of the node 200 assumes that the activation process is completed within the predetermined time period from the time of receiving an SCell activation notification or from the time of transmitting, to the UE 100, a positive acknowledgment (HARQ ACK) to the SCell activation notification. This allows the node 200 to smoothly start data communication over the SCell after activation of the SCell is completed.

In the third embodiment, the transmitter 120 of the UE 100 may transmit information indicating the predetermined time period to the node 200 when transmitting the SCell activation notification or before transmitting the SCell activation notification. The receiver 220 of the node 200 receives information indicating the predetermined time period from the UE 100. This allows the node 200 to appropriately determine the time when the UE 100 completes activation of the SCell and can smoothly start data communication over the SCell. In the following, the predetermined time period is also referred to as a "time offset."

Figure 12:
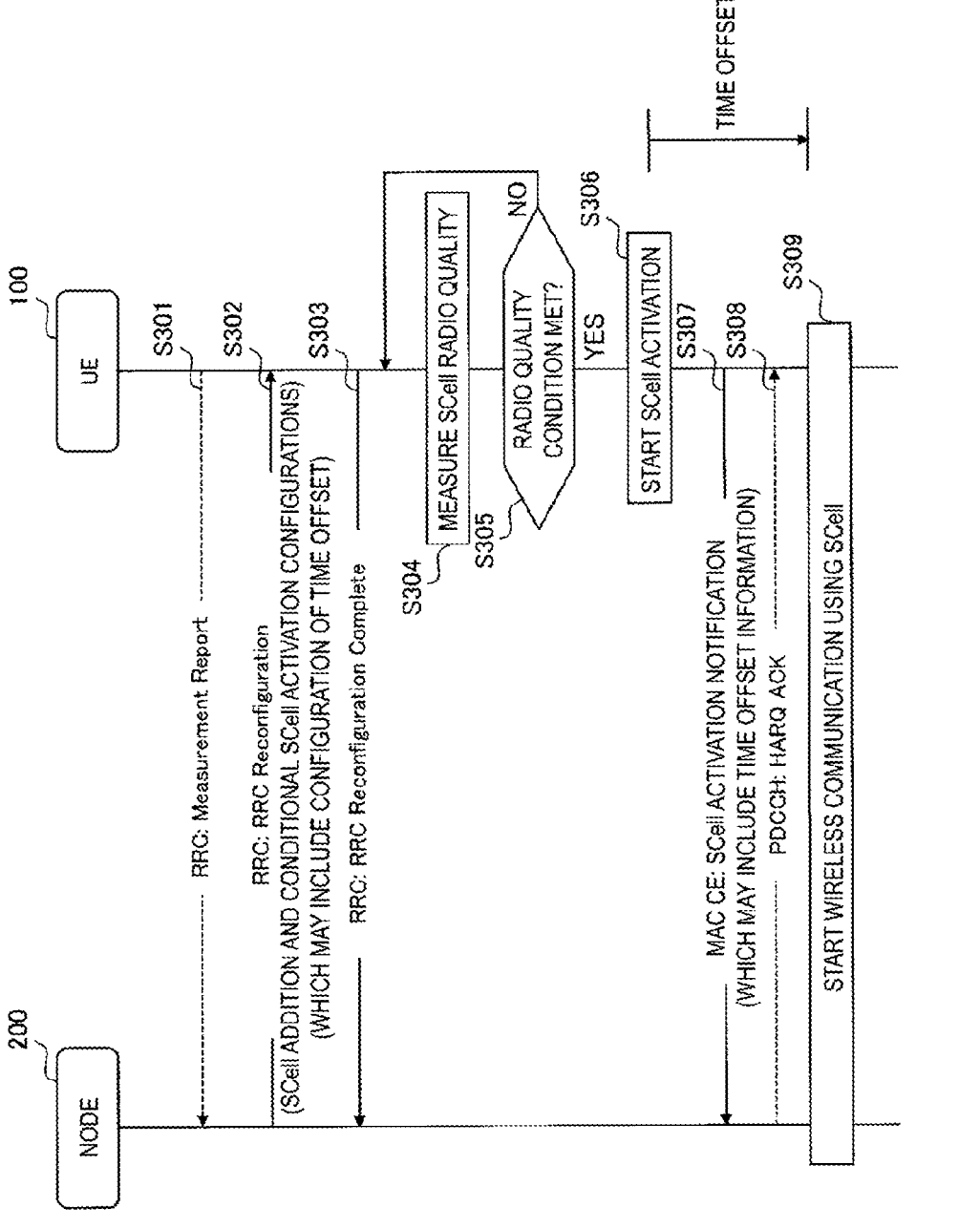
FIG. 12 is a diagram illustrating an operation example of a system according to a third embodiment.

FIG. 12 is a diagram illustrating an operation example of a system according to the third embodiment. In FIG. 12, dashed lines indicate non-essential steps. Overlapping description of operations the same as those of the first embodiment described above will be omitted.

In step S301, the transmitter 120 of the UE 100 transmits a Measurement Report message to the node 200, for example, over the PCell. The receiver 220 of the node 200 receives the Measurement Report message.

In step S302, the transmitter 210 of the node 200 transmits an RRC Reconfiguration message to the UE 100, for example, over the PCell. The receiver 110 of the UE 100 receives the RRC Reconfiguration message.

In the third embodiment, the RRC Reconfiguration message may include configuration information for configuring a time offset from the time of transmitting an SCell activation notification (or from the time of receiving a positive acknowledgment for the notification) to when the SCell activation process is completed in addition to the information described in the first embodiment above. The time offset may be in units of milliseconds (e.g., X ms) or may be in units according to the radio frame structure (e.g., X frames, X subframes, X slots, or X OFDM symbols).

In step S303, the transmitter 110 of the UE 100 transmits an RRC Reconfiguration Complete message to the node 200, for example, over the PCell. The receiver 220 of the node 200 receives the RRC Reconfiguration Complete message.

In step S304, the controller 130 of the UE 100 measures radio quality based on a reference signal of the SCell.

In step S305, the controller 130 of the UE 100 determines whether the radio quality condition configured in step S302 is met. When it is determined that the radio quality condition is not met (NO in step S305), the process returns to step S304.

Upon determining that the radio quality condition is met (YES in step S305), the controller 130 of the UE 100 starts activating the SCell in step S306.

In step S307, the transmitter 120 of the UE 100 transmits an SCell activation notification to the node 200 over the PCell. The receiver 220 of the node 200 receives the SCell activation notification.

In the third embodiment, the SCell activation notification may include information indicating the time offset. The UE 100 determines a time period it will take to complete the SCell activation at the time of transmitting the SCell activation notification and notifies the node 200 of the time period as a time offset.

Alternatively, the UE 100 may notify the network 1 in advance of information indicating a time offset determined according to the capabilities of the UE 100. For example, the node 200 transmits an enquiry message inquiring about the capabilities of the UE 100 (a UE Capability Enquiry message) to the UE 100. The UE 100 transmits a UE capability information message including time offset information to the node 200 in response to receiving the UE Capability Enquiry message.

In step S308, the transmitter 210 of the node 200 transmits a HARQ ACK indicating successful reception of the SCell activation notification to the UE 100 over a PDCCH of the PCell. The receiver 110 of the UE 100 receives the HARQ ACK. Note that step S308 need not be performed if the SCell activation notification is UCI.

The node 200 identifies that the SCell of the UE 100 has become available after the time offset from the time of receiving the SCell activation notification or from the time of transmitting the HARQ ACK. The time offset may be a variable time offset configured in step S302, a variable time offset notified of in step S307, or a fixed time offset predefined in technical specifications.

In step S309, the node 200 performs DL transmission and/or UL granting to the UE 100 over the activated SCell and starts wireless communication (data communication) over the SCell.

(4) Fourth Embodiment

A fourth embodiment will be described with reference to FIGS. 13 and 14, focusing on differences from the embodiments described above. The fourth embodiment is an embodiment based on the first embodiment described above. However, the fourth embodiment may also be an embodiment based on the second embodiment described above.

In the embodiments described above, the UE 100 detects that the radio quality of the SCell meets the predetermined level of quality and activates the SCell or leaves the dormant BWP. Here, to quickly detect that the radio quality of the SCell meets the predetermined level of quality, it is desirable that the UE 100 can constantly measure the radio quality of the SCell. In the embodiments described above, the UE 100 measures the radio quality (such as an RSRP) using SSBs or TRSs (CSI-RSs) as reference signals, but these reference signals are transmitted discretely in time. Thus, at times when no SSBs or CSI-RSs are transmitted, the UE 100 cannot perform wireless communication measurement and may be delayed in detecting that the radio quality of the SCell meets the predetermined level of quality.

When the SCell is activated, the UE 100 establishes time/frequency synchronization using SSBs or TRSs (CSI-RSs) as reference signals and performs processes such as CSI measurement, AGC, and beam management. Thus, at times when no SSBs or CSI-RSs are transmitted, the UE 100 cannot perform the processes for SCell activation and may be delayed in SCell activation.

Therefore, in the fourth embodiment, the transmitter 210 of the node 200 transmits a reference signal (also referred to as a "Fast tracking RS") used for radio quality measurement continuously in the time domain over the SCell. The receiver 110 of the UE 100 receives the Fast tracking RS transmitted continuously in the time domain over the SCell from the node 200. The controller 130 of the UE 100 measures the radio quality of the SCell based on the Fast tracking RS. The controller 130 of the UE 100 may perform a process for SCell activation (e.g., at least one selected from the group consisting of time/frequency synchronization establishment, CSI measurement, AGC, and beam management) based on the Fast tracking RS. This can suppress the delay described above.

Figure 13:
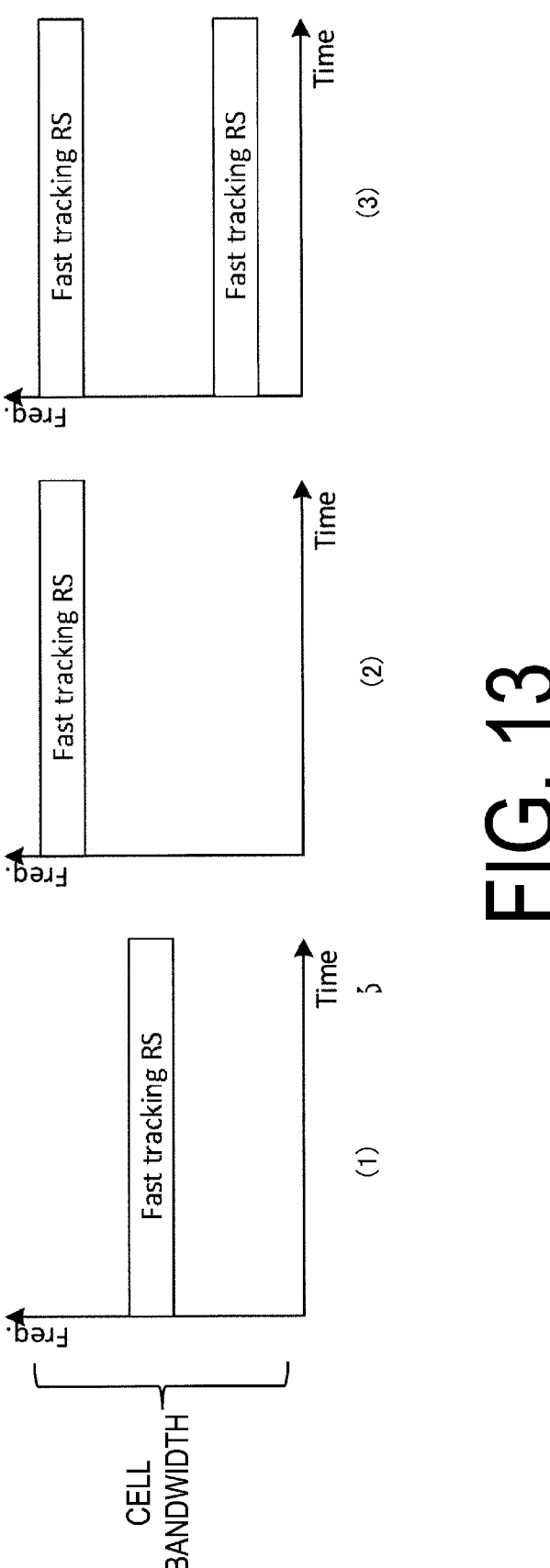
FIG. 13 is a diagram illustrating specific examples of reference signals (Fast tracking RSs) according to a fourth embodiment.

FIG. 13 is a diagram illustrating specific examples of Fast tracking RSs according to the fourth embodiment. Fast tracking RSs according to the fourth embodiment are arranged in some frequency resources in the bandwidth of a cell (SCell).

In the example of (1) of FIG. 13, a Fast tracking RS is arranged in one or more resource blocks in the middle of the bandwidth of the SCell or in one or more subcarriers in the middle of the bandwidth of the SCell. In the example of (2) of FIG. 13, a Fast tracking RS is arranged in one or more resource blocks at one end of the bandwidth of the SCell or in one or more subcarriers at one end of the bandwidth of the SCell. In the example of (3) of FIG. 13, the Fast tracking RS is arranged in one or more resource blocks at both ends of the bandwidth of the SCell or in one or more subcarriers on both sides of the bandwidth of the SCell.

Figure 14:
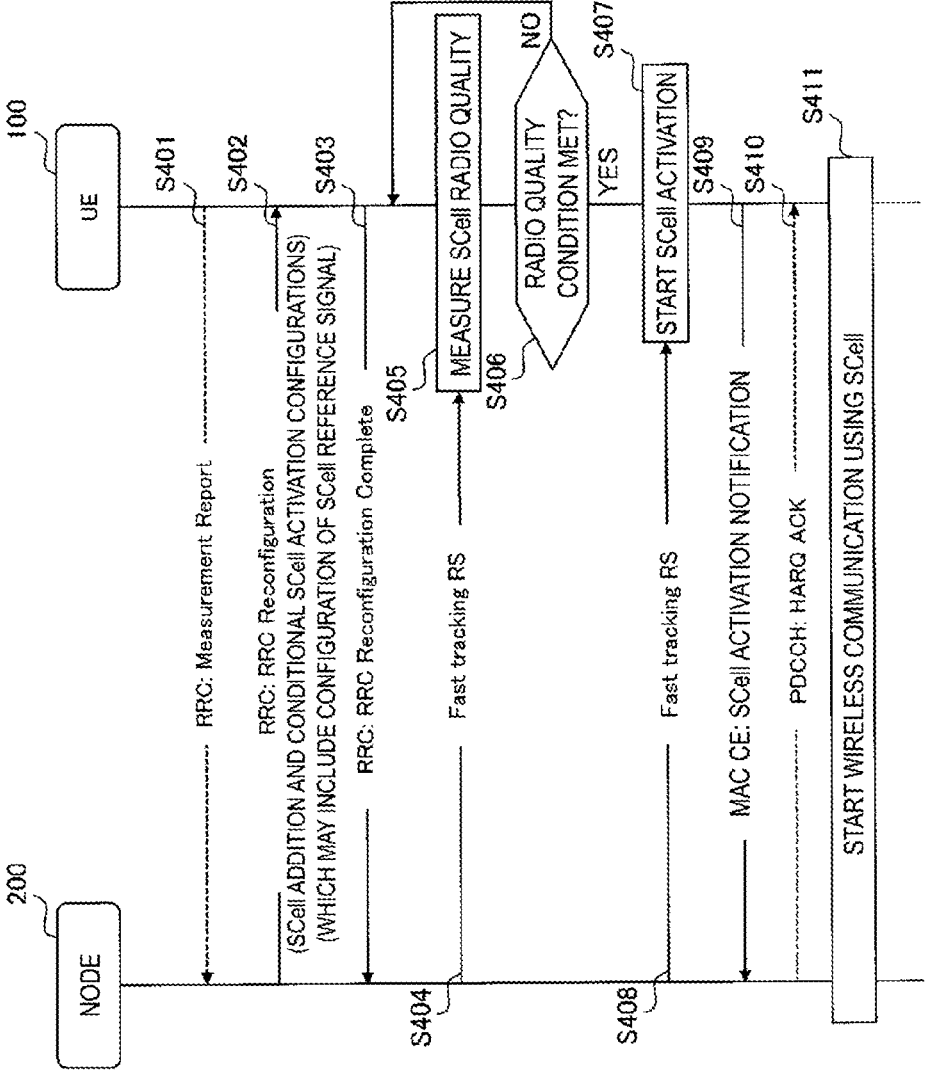
FIG. 14 is a diagram illustrating an operation example of a system according to the fourth embodiment.

FIG. 14 is a diagram illustrating an operation example of a system according to the fourth embodiment. In FIG. 14, dashed lines indicate non-essential steps. Overlapping description of operations the same as those of the first embodiment described above will be omitted.

In step S401, the transmitter 120 of the UE 100 transmits a Measurement Report message to the node 200, for example, over the PCell. The receiver 220 of the node 200 receives the Measurement Report message.

In step S402, the transmitter 210 of the node 200 transmits an RRC Reconfiguration message to the UE 100, for example, over the PCell. The receiver 110 of the UE 100 receives the RRC Reconfiguration message.

In the fourth embodiment, the RRC Reconfiguration message may include configuration information regarding a Fast tracking RS in addition to the information described in the first embodiment above. The configuration information regarding a Fast tracking RS includes at least one selected from the group consisting of information indicating the presence or absence of a Fast tracking RS, information indicating the position of the Fast tracking RS on the frequency axis (e.g., a resource block number, a subcarrier number, and/or an Absolute Radio-Frequency Channel Number (ARFCN)), and information that assists in demodulating the Fast tracking RS (e.g., a root sequence number indicating the signal sequence of the reference signal).

The node 200 may broadcast the configuration information regarding a Fast tracking RS in a system information block (SIB) of the PCell.

In step S403, the transmitter 110 of the UE 100 transmits an RRC Reconfiguration Complete message to the node 200, for example, over the PCell. The receiver 220 of the node 200 receives the RRC Reconfiguration Complete message.

In step S404, the transmitter 210 of the node 200 transmits a steady Fast tracking RS on the time axis in the SCell targeted for high speed detection. The receiver 110 of the UE 100 receives the Fast tracking RS over the SCell.

In step S405, the controller 130 of the UE 100 measures radio quality based on the Fast tracking RS of the SCell.

In step S406, the controller 130 of the UE 100 determines whether the radio quality condition set in step S402 is met. When it is determined that the radio quality condition is not met (NO in step S406), the process returns to step S405.

Upon determining that the radio quality condition is met (YES in step S406), the controller 130 of the UE 100 starts activating the SCell in step S407. Here, the transmitter 210 of the node 200 transmits a steady Fast tracking RS on the time axis in the SCell targeted for high speed detection (step S408). The controller 130 of the UE 100 may perform control for establishing time/frequency synchronization with the SCell using the Fast tracking RS. The controller 130 of the UE 100 may also perform CSI measurement, AGC, and beam management for the SCell using the Fast tracking RS.

In step S409, the transmitter 120 of the UE 100 transmits an SCell activation notification to the node 200 over the PCell. The receiver 220 of the node 200 receives the SCell activation notification.

In step S410, the transmitter 210 of the node 200 transmits a HARQ ACK indicating successful reception of the SCell activation notification to the UE 100 over a PDCCH of the PCell. The receiver 110 of the UE 100 receives the HARQ ACK. Note that step S408 need not be performed if the SCell activation notification is UCI.

In step S411, the node 200 performs DL transmission and/or UL granting to the UE 100 over the activated SCell and starts wireless communication (data communication) over the SCell.

(5) Other Embodiments

The first to fourth embodiments described above may be implemented independently or two or more of the embodiments may be combined and implemented.

Although examples in which the SCell is a THz wave cell have been mainly described in the embodiments above, the SCell is not limited to a THz wave cell. For example, the SCell may be a mmW cell.

The operational flow of each of the embodiments described above does not necessarily have to be executed in chronological order according to the order described in the flow diagram. For example, the steps of operation may be performed in a different order from that described in the flow diagram or may be performed in parallel. Some steps of operation may be omitted and additional steps may be added to the process.

A program that causes the computer (the UE 100, the node 200) to perform operations according to the embodiments described above may be provided. The program may be recorded on a computer readable medium. The computer readable medium allows installation of the program on a computer. Here, the computer readable medium on which the program is recorded may be a non-transitory recording medium. The non-transitory recording medium is not particularly limited, but may be, for example, a recording medium such as a CD-ROM or a DVD-ROM.

The phrases "based on" and "depending on/in response to" used in the present disclosure do not mean "based only on" and "only depending on/in response to," unless specifically stated otherwise. The phrase "based on" means both "based only on" and "based at least in part on." The phrase "depending on/in response to" means both "only depending on/in response to" and "at least partially depending on/in response to." The terms "include", "comprise" and variations thereof do not mean "include only items stated" but instead mean "may include only items stated" or "may include not only the items stated but also other items." The term "or" used in the present disclosure is not intended to be "exclusive or." Any references to elements using designations such as "first" and "second" as used in the present disclosure do not generally limit the quantity or order of those elements. These designations may be used herein as a convenient method of distinguishing between two or more elements. Thus, a reference to first and second elements does not mean that only two elements may be employed there or that the first element needs to precede the second element in some manner. For example, when the English articles such as "a," "an," and "the" are added in the present disclosure through translation, these articles include the plural unless clearly indicated otherwise in context.

Although embodiments have been described in detail with reference to the drawings, the specific configurations thereof are not limited to those described above and various design changes can be made without departing from the spirit of the disclosure.

(6) SUPPLEMENTS

Features relating to the embodiments described above are described below as supplements.

Supplement 1

A user equipment for performing wireless communication with a node using carrier aggregation in a mobile communication system, the user equipment including: a receiver configured to receive, from the node, information indicating a radio quality condition that is to be met for the user equipment to perform an activation process for a secondary cell configured for the user equipment; and a controller configured to measure radio quality and evaluate whether the radio quality condition is met, wherein the controller is configured to perform the activation process for the secondary cell in response to the radio quality condition being met.

Supplement 2

The user equipment according to supplement 1, wherein the activation process includes a process of transitioning the secondary cell that is in an inactive state to an active state.

Supplement 3

The user equipment according to supplement 1 or 2, wherein the activation process includes a process of causing a bandwidth part that is in a dormant state in the secondary cell to leave the dormant state.

Supplement 4

The user equipment according to any one of supplements 1 to 3, further including a transmitter configured to transmit a notification regarding the activation process to the node in response to the radio quality condition being met.

Supplement 5

The user equipment according to supplement 4, wherein the transmitter is configured to transmit the notification to the node over a primary cell.

Supplement 6

The user equipment according to supplement 4 or 5, wherein the controller is configured to complete the activation process within a predetermined time period from a time of transmitting the notification or from a time of receiving a positive acknowledgment to the notification from the node.

Supplement 7

The user equipment according to supplement 6, wherein the transmitter is configured to transmit information indicating the predetermined time period to the node when transmitting the notification or before transmitting the notification.

Supplement 8

The user equipment according to any one of supplements 1 to 7, wherein the receiver is configured to receive a reference signal transmitted continuously in a time domain over the secondary cell from the node, and the controller is configured to measure the radio quality based on the reference signal.

Supplement 9

A node for performing wireless communication with a user equipment using carrier aggregation in a mobile communication system, the node including: a controller configured to configure a secondary cell for the user equipment; and a transmitter configured to transmit, to the user equipment, information indicating a radio quality condition that is to be met for the user equipment to perform an activation process for the secondary cell.

Supplement 10

The node according to supplement 9, wherein the activation process includes a process of transitioning the secondary cell that is in an inactive state to an active state.

Supplement 11

The node according to supplement 9 or 10, wherein the activation process includes a process of causing a bandwidth part that is in a dormant state in the secondary cell to leave the dormant state.

Supplement 12

The node according to any one of supplements 9 to 11, further including a receiver configured to receive a notification regarding the activation process from the user equipment in response to the radio quality condition being met in the user equipment.

Supplement 13

The node according to supplement 12, wherein the receiver is configured to receive the notification from the user equipment over a primary cell.

Supplement 14

The node according to supplement 12 or 13, wherein the controller is configured to assume that the activation process is completed within a predetermined time period from a time of receiving the notification or from a time of transmitting, to the user equipment, a positive acknowledgment to the notification.

Supplement 15

The node according to supplement 14, wherein the receiver is configured to receive information indicating the predetermined time period from the user equipment when receiving the notification or before receiving the notification.

Supplement 16

The node according to any one of supplements 9 to 15, wherein the transmitter is configured to transmit a reference signal used to measure the radio quality continuously in the time domain over the secondary cell.

Supplement 17

A communication method used in a user equipment configured to perform wireless communication with a node using carrier aggregation in a mobile communication system, the method including: receiving, from the node, information indicating a radio quality condition that is to be met for the user equipment to perform an activation process for a secondary cell configured for the user equipment; measuring radio quality and evaluating whether the radio quality condition is met; and performing the activation process for the secondary cell in response to the radio quality condition being met.

Supplement 18

A communication method used in a node configured to perform wireless communication with a user equipment using carrier aggregation in a mobile communication system, the method including: configuring a secondary cell for the user equipment; and transmitting, to the user equipment, information indicating a radio quality condition that is to be met for the user equipment to perform an activation process for the secondary cell.

REFERENCE SIGNS

1: Network
10: RAN
20: CN
100: UE
110: Receiver
120: Transmitter
130: Controller
140: Wireless communicator
200: Node
210: Transmitter 220: Receiver
230: Controller
240: NW communicator
250: Wireless communicator
300: CN apparatus

The invention claimed is:

1. A user equipment comprising:

a controller configured to perform wireless communication with a single node using carrier aggregation in which a plurality of serving cells including a primary cell and one or more secondary cells is configured for the user equipment; and a receiver configured to receive, from the single node, a threshold indicating a radio quality condition that is to be met for the user equipment to perform an activation process only for one of the one or more secondary cells among the plurality of serving cells of the single node configured for the user equipment, wherein the activation process does not include transmission of a measurement report from the user equipment to the single node, wherein, when the controller is configured to perform the carrier aggregation, the user equipment has one connection to a network, wherein the controller is configured to measure radio quality and evaluate whether the radio quality condition is is better than the radio quality condition indicated by the threshold for the one or more secondary cells among the plurality of serving cells of the single node, and perform the activation process via the one connection to the network only for one of the one or more secondary cells among the plurality of serving cells of the single node without transmitting the measurement report, upon the radio quality being better than the radio quality condition indicated by the threshold.

2. The user equipment according to claim 1, wherein the activation process comprises a process of transitioning the secondary cell that is in an inactive state to an active state.

3. The user equipment according to claim 1, wherein the activation process comprises a process of causing a bandwidth part that is in a dormant state in the secondary cell to leave the dormant state.

4. The user equipment according to claim 1, further comprising a transmitter configured to transmit a notification regarding the activation process to the node in response to the radio quality condition being met.

5. The user equipment according to claim 4, wherein the transmitter is configured to transmit the notification to the node over a primary cell.

6. The user equipment according to claim 4, wherein the controller is configured to complete the activation process within a predetermined time period from a time of transmitting the notification or from a time of receiving a positive acknowledgment to the notification from the node.

7. The user equipment according to claim 6, wherein the transmitter is configured to transmit information indicating the predetermined time period to the node when transmitting the notification or before transmitting the notification.

8. The user equipment according to claim 1, wherein the receiver is configured to receive a reference signal transmitted continuously in a time domain over the secondary cell from the node, and the controller is configured to measure the radio quality based on the reference signal.

9. A node comprising:

a controller configured to configure one or more secondary cells of the node for a user equipment that performs wireless communication, the node being a single node that is a node using carrier aggregation in which a plurality of serving cells including a primary cell and the one or more secondary cells are configured for the user equipment; and a transmitter configured to configure the user equipment to perform carrier aggregation, including transmitting, to the user equipment, a threshold indicating a radio quality condition that is to be met for the user equipment to perform an activation process only for one of the one or more secondary cells among the plurality of serving cells of the single node, so that, when the carrier aggregation is performed, the activation process does not include transmission of a measurement report from the user equipment to the single node, and the user equipment has one connection to a network.

10. The node according to claim 9, wherein the activation process comprises a process of transitioning the secondary cell that is in an inactive state to an active state.

11. The node according to claim 9, wherein the activation process comprises a process of causing a bandwidth part that is in a dormant state in the secondary cell to leave the dormant state.

12. The node according to claim 9, further comprising a receiver configured to receive a notification regarding the activation process from the user equipment in response to the radio quality condition being met in the user equipment.

13. The node according to claim 12, wherein the receiver is configured to receive the notification from the user equipment over a primary cell.

14. The node according to claim 12, wherein the controller is configured to assume that the activation process is completed within a predetermined time period from a time of receiving the notification or from a time of transmitting, to the user equipment, a positive acknowledgment to the notification.

15. The node according to claim 14, wherein the receiver is configured to receive information indicating the predetermined time period from the user equipment when receiving the notification or before receiving the notification.

16. The node according to claim 9, wherein the transmitter is configured to transmit a reference signal used to measure the radio quality continuously in the time domain over the secondary cell.

17. A communication method used in a user equipment, the method comprising:

performing wireless communication with a single node using carrier aggregation in which a plurality of serving cells including a primary cell and one or more secondary cells is configured for the user equipment;

receiving, from the single node, a threshold indicating a radio quality condition that is to be met for the user equipment to perform an activation process only for one of the one or more secondary cells among the plurality of serving cells of the single node configured for the user equipment, wherein the activation process does not include transmission of a measurement report from the user equipment to the single node, wherein, when the carrier aggregation is performed, the user equipment has one connection to a network;

measuring radio quality and evaluating whether the radio quality condition is is better than the radio quality condition indicated by the threshold for the one or more secondary cells among the plurality of serving cells of the single node; and performing the activation process via the one connection to the network only for one of the one or more secondary cells among the plurality of serving cells of the single node without transmitting the measurement report, upon the radio quality being better than the radio quality condition indicated by the threshold.

18. A communication method used in a node configured to perform wireless communication with a user equipment, the method comprising:

configuring one or more secondary cells of the node for the user equipment that performs wireless communication, the node being a single node that is a node using carrier aggregation in which a plurality of serving cells including a primary cell and the one or more secondary cells are configured for the user equipment; and configuring the user equipment to perform carrier aggregation, including transmitting, to the user equipment, a threshold indicating a radio quality condition that is to be met for the user equipment to perform an activation process only for one of the one or more secondary cells among the plurality of serving cells of the single node, so that when the carrier aggregation is performed, the activation process does not include transmission of a measurement report from the user equipment to the single node, and the user equipment has one connection to a network.

* * * * *